(12) United States Patent
Gildert et al.

(10) Patent No.: US 12,377,541 B2
(45) Date of Patent: *Aug. 5, 2025

(54) SYSTEMS, DEVICES, AND METHODS FOR GRASPING BY MULTI-PURPOSE ROBOTS

(71) Applicant: Sanctuary Cognitive Systems Corporation, Vancouver (CA)

(72) Inventors: Suzanne Gildert, Vancouver (CA); Olivia Norton, North Vancouver (CA); Geordie Rose, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 28 days.

This patent is subject to a terminal disclaimer.

(21) Appl. No.: 18/206,741

(22) Filed: Jun. 7, 2023

(65) Prior Publication Data
US 2023/0311316 A1 Oct. 5, 2023

Related U.S. Application Data

(63) Continuation of application No. 17/566,589, filed on Dec. 30, 2021, now Pat. No. 11,938,634, and a
(Continued)

(51) Int. Cl.
*B25J 9/16* (2006.01)
(52) U.S. Cl.
CPC .................. *B25J 9/1661* (2013.01)
(58) Field of Classification Search
CPC ........ B25J 9/1661; B25J 9/1671; B25J 9/163; B25J 9/1697; B25J 19/023;
(Continued)

(56) References Cited

U.S. PATENT DOCUMENTS 10,131,051 B1 * 11/2018 Goyal ................. B25J 9/1697
11,717,963 B2 * 8/2023 Gildert ................ B25J 9/1661
700/245

(Continued)

FOREIGN PATENT DOCUMENTS

CN 104137051 A 11/2014
CN 108972494 A 12/2018

*Primary Examiner* — Bao Long T Nguyen
(74) *Attorney, Agent, or Firm* — Adenike Adebiyi; Thomas Mahon

(57) ABSTRACT

Systems, devices, and methods for training and operating (semi-)autonomous robots to complete multiple different work objectives are described. A robot control system stores a library of reusable work primitives each corresponding to a respective basic sub-task or sub-action that the robot is operative to autonomously perform. A work objective is analyzed to determine a sequence (i.e., a combination and/or permutation) of reusable work primitives that, when executed by the robot, will complete the work objective. The robot executes the sequence of reusable work primitives to complete the work objective. The reusable work primitives may include one or more reusable grasp primitives that enable(s) a robot's end effector to grasp objects. Simulated instances of real physical robots may be trained in simulated environments to develop control instructions that, once uploaded to the real physical robots, enable such real physical robots to autonomously perform reusable work primitives.

15 Claims, 10 Drawing Sheets

Related U.S. Application Data continuation of application No. 17/566,595, filed on Dec. 30, 2021, now Pat. No. 11,717,963.

(60) Provisional application No. 63/232,694, filed on Aug. 13, 2021, provisional application No. 63/151,044, filed on Feb. 18, 2021.

(58) Field of Classification Search
CPC ........... G05B 2219/40395; G05B 2219/39244; G05B 2219/39536; G05B 2219/39543; G06T 7/60

See application file for complete search history.

(56) References Cited

U.S. PATENT DOCUMENTS

2017/0348854 A1* 12/2017 Oleynik .................. A47J 47/02
2018/0272535 A1*  9/2018 Ogawa .................. B25J 13/085

* cited by examiner

SYSTEMS, DEVICES, AND METHODS FOR GRASPING BY MULTI-PURPOSE ROBOTS

CROSS-REFERENCE TO RELATED APPLICATIONS

This application is a continuation of U.S. patent application Ser. No. 17/566,595, filed Dec. 30, 2021, which is a continuation of U.S. patent application Ser. No. 17/566,589, which claims the benefit of U.S. Provisional Application No. 63/151,044, filed Feb. 18, 2021, and U.S. Provisional Application No. 63/232,694, filed Aug. 13, 2021, the disclosures of which are incorporated herein by reference.

TECHNICAL FIELD

The present systems, devices, and methods generally relate to multi-purpose robots and particularly relate to robots that are capable of at least semi-autonomously completing multiple different work objectives.

BACKGROUND

Robots are machines that may be deployed to perform work. Robots may come in a variety of different form factors, including humanoid form factors. Humanoid robots may be operated by tele-operation systems through which the robot is caused to emulate the physical actions of a human operator or pilot; however, such tele-operation systems typically require very elaborate and complicated interfaces comprising sophisticated sensors and equipment worn by or otherwise directed towards the pilot, thus requiring that the pilot devote their full attention to the tele-operation of the robot and limiting the overall accessibility of the technology.

Robots may be trained or otherwise programmed to operate semi-autonomously or fully autonomously. Training a robot typically involves causing the robot to repeatedly perform a physical task in the real world, which can cause significant wear and tear on the components of the robot before the robot can even be deployed to perform useful work in the field.

SUMMARY

A method of operation of a robot (wherein the robot includes at least one processor and a non-transitory processor-readable storage medium communicatively coupled to the at least one processor, the non-transitory processor-readable storage medium storing a library of reusable work primitives and processor-executable instructions that, when executed by the at least one processor, cause the robot to autonomously perform the reusable work primitives in the library of reusable work primitives) may be summarized as including: initiating a first work objective; initiating a first workflow to complete the first work objective, the first workflow comprising a first set of reusable work primitives selected from the library of reusable work primitives; and executing the first workflow, wherein executing the first workflow includes executing the first set of reusable work primitives. The method may further include: initiating a second work objective that is different from the first work objective; initiating a second workflow to complete the second work objective, the second workflow comprising a second set of reusable work primitives selected from the library of reusable work primitives, wherein the second workflow is different from the first workflow and at least one common reusable work primitive is included in both the first workflow and the second workflow; and executing the second workflow, wherein executing the second workflow includes executing the second set of reusable work primitives. The method may further include: initiating at least one additional work objective that is different from both the first work objective and the second work objective; initiating at least one additional workflow to complete the at least one additional work objective, the at least one additional workflow comprising at least one additional set of reusable work primitives selected from the library of reusable work primitives, wherein the at least one additional workflow is different from both the first workflow and the second workflow, and wherein at least one common reusable work primitive is included in all of the first workflow, the second workflow, and the at least one additional workflow; and executing the at least one additional workflow, wherein executing the at least one additional workflow includes executing the at least one additional set of reusable work primitives.

The robot may include a telecommunication interface communicatively coupled to the at least one processor, and initiating a first work objective may include receiving instructions related to the first work objective via the telecommunications interface and/or initiating a first workflow to complete the first work objective may include receiving the first workflow via the telecommunications interface. Initiating a first work objective may include autonomously identifying, by the robot, the first work objective. Initiating a first workflow to complete the first work objective may include autonomously identifying the first set of reusable work primitives by the robot.

The robot may include at least a first physically actuatable component communicatively coupled to the at least one processor and the library of reusable work primitives may include a set of reusable work primitives performable by the first physically actuatable component. Initiating a first workflow to complete the first work objective may include initiating a first set of reusable work primitives that includes at least one reusable work primitive from the set of reusable work primitives performable by the first physically actuatable component. Executing the first workflow may include executing, by the first physically actuatable component, the at least one reusable work primitive from the set of reusable work primitives performable by the first physically actuatable component. The first physically actuatable component may be operative to grasp objects and the set of reusable work primitives performable by the first physically actuatable component may include a set of reusable grasp primitives performable by the first physically actuatable component. Initiating a first set of reusable work primitives that includes at least one reusable work primitive from the set of reusable work primitives performable by the first physically actuatable component may include initiating a first set of reusable work primitives that includes at least one reusable grasp primitive. Executing, by the first physically actuatable component, the at least one reusable work primitive from the set of reusable work primitives performable by the first physically actuatable component may include executing, by the first physically actuatable component, the at least one reusable grasp primitive.

Initiating a first workflow to complete the first work objective may include initiating a first permutation of a first combination of reusable work primitives from the library of reusable work primitives. Executing the first set of reusable work primitives may include executing, by the at least one processor, the processor-executable instructions stored in the non-transitory processor-readable storage medium to cause the robot to autonomously perform the first set of reusable work primitives.

A robot may be summarized as including: a body; at least one physically actuatable component mechanically coupled to the body; at least one processor communicatively coupled to the at least one physically actuatable component; and at least one non-transitory processor-readable storage medium communicatively coupled to the at least one processor, the at least one non-transitory processor-readable storage medium storing a library of reusable work primitives and processor-executable instructions that, when executed by at least one processor, cause the robot to: initiate a first work objective; initiate a first workflow to complete the first work objective, the first workflow comprising a first set of reusable work primitives selected from the library of reusable work primitives; and execute the first workflow, wherein executing the first workflow includes executing the first set of reusable work primitives. The processor-executable instructions, when executed by the at least one processor, may further cause the robot to: initiate a second work objective that is different from the first work objective; initiate a second workflow to complete the second work objective, the second workflow comprising a second set of reusable work primitives selected from the library of reusable work primitives, wherein the second workflow is different from the first workflow and at least one common reusable work primitive is included in both the first workflow and the second workflow; and execute the second workflow, wherein executing the second workflow includes executing the second set of reusable work primitives. The robot may further include a telecommunication interface communicatively coupled to the at least one processor to receive at least one set of instructions from a group consisting of: instructions related to the first work objective and instructions related to the first workflow. The non-transitory processor-readable storage medium may further store processor-executable instructions that, when executed by the at least one processor, cause the robot to autonomously identify the first workflow to complete the first work objective.

The library of reusable work primitives may include a set of reusable work primitives performable by the at least one physically actuatable component, and the processor-executable instructions that, when executed by the at least one processor, cause the robot to execute the first set of reusable work primitives, may cause the at least one physically actuatable component to perform at least one reusable work primitive. The at least one physically actuatable component may include an end effector that is operative to grasp objects and the set of reusable work primitives performable by the at least one physically actuatable component may include a set of reusable grasp primitives performable by the end effector. The processor-executable instructions that, when executed by the at least one processor, cause the at least one physically actuatable component to perform at least one reusable work primitive, may cause the end effector to perform at least one grasp primitive.

A computer program product may be summarized as including: a library of reusable work primitives; and processor-executable instructions and/or data that, when the computer program product is stored in a non-transitory processor-readable storage medium of a robot system and executed by at least one processor of the robot system, the at least one processor communicatively coupled to the non-transitory processor-readable storage medium, cause the robot system to: initiate a first work objective; initiate a first workflow to complete the first work objective, the first workflow comprising a first set of reusable work primitives selected from the library of reusable work primitives; and execute the first workflow, wherein executing the first workflow includes executing the first set of reusable work primitives. The computer program product may further include: processor-executable instructions and/or data that, when the computer program product is stored in the non-transitory processor-readable storage medium of the robot system and executed by at least one processor of the robot system, cause the robot system to: initiate a second work objective that is different from the first work objective; initiate a second workflow to complete the second work objective, the second workflow comprising a second set of reusable work primitives selected from the library of reusable work primitives, wherein the second workflow is different from the first workflow and at least one common reusable work primitive is included in both the first workflow and the second workflow; and execute the second workflow, wherein executing the second workflow includes executing the second set of reusable work primitives. The computer program product may further include processor-executable instructions and/or data that, when the computer program product is stored in the non-transitory processor-readable storage medium of the robot system and executed by at least one processor of the robot system, cause the robot system to autonomously identify the first workflow to complete the first work objective.

A method of operation of a robot to grasp an object is described. The robot performing the method may be summarized as including: a robotic hand having multiple fingers and an opposable thumb; at least one processor operative to control actuations of the robotic hand; at least one sensor communicatively coupled to the at least one processor; and a non-transitory processor-readable storage medium communicatively coupled to the at least one processor, the non-transitory processor-readable storage medium storing a library of reusable grasp primitives and processor-executable instructions that, when executed by the at least one processor, cause the robotic hand to autonomously perform the reusable grasp primitives in the library of reusable grasp primitives. The method may be summarized as including: collecting data about the object by the at least one sensor; analyzing the data by the at least one processor to determine a geometry of the object; selecting, by the at least one processor, a particular reusable grasp primitive from the library of reusable grasp primitives based, at least in part, on the geometry of the object; and executing, by the robotic hand, the particular reusable grasp primitive to grasp the object. Executing, by the robotic hand, the particular reusable grasp primitive to grasp the object may include executing, by the at least one processor, processor-executable instructions that cause the robotic hand to autonomously perform the particular reusable grasp primitive to grasp the object.

The at least one sensor may include at least one optical sensor. Collecting data about the object by the at least one sensor may include collecting optical data about the object by the at least one optical sensor. Analyzing the data by the at least one processor to determine a geometry of the object may include analyzing the optical data by the at least one processor to determine the geometry of the object.

Selecting, by the at least one processor, a particular reusable grasp primitive from the library of reusable grasp primitives based, at least in part, on the geometry of the object may include selecting, by the at least one processor, the particular reusable grasp primitive that best fits the geometry of the object relative to all other reusable grasp primitives in the library of reusable grasp primitives. Selecting, by the at least one processor, the particular reusable grasp primitive that best fits the geometry of the object may include selecting, by the at least one processor, the particular reusable grasp primitive that employs a configuration of the multiple fingers and the opposable thumb of the robotic hand that best accommodates the geometry of the object relative to all other reusable grasp primitives in the library of reusable grasp primitives.

Selecting, by the at least one processor, the particular reusable grasp primitive that best fits the geometry of the object may include simulating, by the at least one processor, the robotic hand grasping the object with each reusable grasp primitive in the library of reusable grasp primitives to determine which particular reusable grasp primitive in the library of reusable grasp primitives best fits the geometry of the object relative to all other grasp primitives in the library of reusable grasp primitives.

The method may further include analyzing additional data about the object by the at least one processor to determine at least one additional parameter of the object. In this case, selecting, by the at least one processor, a particular reusable grasp primitive from the library of reusable grasp primitives based, at least in part, on the geometry of the object may include selecting, by the at least one processor, the particular reusable grasp primitive from the library of reusable grasp primitives based, at least in part, on both the geometry of the object and the at least one additional parameter of the object. The method may further include collecting the additional data about the object by the at least one sensor, wherein the additional data about the object is selected from a group consisting of: a hardness of the object, a rigidity of the object, an identity of the object, a function of the object, and a mass of the object. The robot may further include at least one receiver communicatively coupled to the at least one processor and the method may include receiving the additional data about the object by the receiver.

The non-transitory processor-readable storage medium may further store data about a work objective to be performed by the robot, the work objective involving grasping the object. In this case, selecting, by the at least one processor, a particular reusable grasp primitive from the library of reusable grasp primitives based, at least in part, on the geometry of the object may include selecting, by the at least one processor, the particular reusable grasp primitive from the library of reusable grasp primitives based, at least in part, on both the geometry of the object and the data about the work objective to be performed by the robot.

A robot may be summarized as including: a body; a robotic hand mechanically coupled to the body, the robotic hand having multiple fingers and an opposable thumb; at least one processor operative to control actuations of the robotic hand; at least one sensor communicatively coupled to the at least one processor; and a non-transitory processor-readable storage medium communicatively coupled to the at least one processor, the non-transitory processor-readable storage medium storing a library of reusable grasp primitives and processor-executable instructions that, when executed by the at least one processor, cause the robot to: collect data about the object; analyze the data to determine a geometry of the object; select a particular reusable grasp primitive from the library of reusable grasp primitives based, at least in part, on the geometry of the object; and execute the particular reusable grasp primitive to grasp the object. The processor-executable instructions that, when executed by the at least one processor, cause the robot to execute the particular reusable grasp primitive to grasp the object, may cause the robotic hand to autonomously perform the particular reusable grasp primitive to grasp the object. The at least one sensor may include at least one optical sensor, and the processor-executable instructions that, when executed by the at least one processor, cause the robot to collect data about the object, may cause the at least one optical sensor to collect optical data about the object.

The processor-executable instructions that, when executed by the at least one processor, cause the robot to select a particular reusable grasp primitive from the library of reusable grasp primitives based, at least in part, on the geometry of the object, may cause the robot to select the particular reusable grasp primitive that best fits the geometry of the object relative to all other reusable grasp primitives in the library of reusable grasp primitives. The processor-executable instructions that, when executed by the at least one processor, cause the robot to select the particular reusable grasp primitive that best fits the geometry of the object, may cause the robot to select the particular reusable grasp primitive that employs a configuration of the multiple fingers and the opposable thumb of the robotic hand that best accommodates the geometry of the object relative to all other reusable grasp primitives in the library of reusable grasp primitives.

The processor-executable instructions that, when executed by the at least one processor, cause the robot to select a particular reusable grasp primitive from the library of reusable grasp primitives based, at least in part, on the geometry of the object, may cause the robot to simulate the robotic hand grasping the object with each reusable grasp primitive in the library of reusable grasp primitives to determine which particular reusable grasp primitive in the library of reusable grasp primitives best fits the geometry of the object relative to all other grasp primitives in the library of reusable grasp primitives.

The non-transitory processor-readable storage medium may further store processor-executable instructions that, when executed by the at least one processor, cause the robot to analyze additional data about the object to determine at least one additional parameter of the object. In this case, the processor-executable instructions that, when executed by the at least one processor, cause the robot to select a particular reusable grasp primitive from the library of reusable grasp primitives based, at least in part, on the geometry of the object, may cause the robot to select a particular reusable grasp primitive from the library of reusable grasp primitives based, at least in part, on both the geometry of the object and the at least one additional parameter of the object. The non-transitory processor-readable storage medium may further store processor-executable instructions that, when executed by the at least one processor, cause the robot to collect the additional data about the object, where the additional data about the object is selected from a group consisting of: a hardness of the object, a rigidity of the object, an identity of the object, a function of the object, and a mass of the object. The robot may further include at least one receiver communicatively coupled to the at least one processor, and the non-transitory processor-readable storage medium may further store processor-executable instructions that, when executed by the at least one processor, cause the robot to receive the additional data about the object.

The non-transitory processor-readable storage medium may further store data about a work objective to be performed by the robot, the work objective involving grasping the object. In this case, the processor-executable instructions that, when executed by the at least one processor, cause the robot to select a particular reusable grasp primitive from the library of reusable grasp primitives based, at least in part, on the geometry of the object, may cause the robot to select the particular reusable grasp primitive from the library of reusable grasp primitives based, at least in part, on both the geometry of the object and the data about the work objective to be performed by the robot.

A computer-implemented method of initializing a robot to complete a multitude of work objectives may be summarized as including: defining a library of reusable work primitives each performable by the robot, wherein respective combinations and permutations of reusable work primitives from the library of reusable work primitives are initiated and executed by the robot in order to complete respective work objectives; and training the robot to autonomously perform each reusable work primitive in the library of reusable work primitives.

Training the robot to autonomously perform each reusable work primitive in the library of reusable work primitives may include training the robot to autonomously perform each reusable work primitive in the library of reusable work primitives in a simulated environment. Training the robot to autonomously perform each reusable work primitive in the library of reusable work primitives in a simulated environment may include: generating a first simulated instance of the robot in the simulated environment; repeatedly executing processor-executable instructions to cause the first simulated instance of the robot to perform a first reusable work primitive in the library of reusable work primitives; and refining the processor-executable instructions that cause the first simulated instance of the robot to perform the first reusable work primitive based on at least one result of repeatedly executing the processor-executable instructions to cause the first simulated instance of the robot to perform the first reusable work primitive. Training the robot to autonomously perform each reusable work primitive in the library of reusable work primitives in a simulated environment may further include: generating at least one additional simulated instance of the robot in the simulated environment; repeatedly executing processor-executable instructions to cause the at least one additional simulated instance of the robot to perform the first reusable work primitive in the library of reusable work primitives; and refining the processor-executable instructions that cause both the first simulated instance of the robot and the at least one additional simulated instance of the robot to perform the first reusable work primitive based on at least one result of repeatedly executing the processor-executable instructions to cause the first simulated instance of the robot and the at least one additional simulated instance of the robot to perform the first reusable work primitive. In some implementations, training the robot to autonomously perform each reusable work primitive in the library of reusable work primitives in a simulated environment may include: repeatedly executing processor-executable instructions to cause the first simulated instance of the robot to perform at least one additional reusable work primitive in the library of reusable work primitives; and refining the processor-executable instructions that cause the first simulated instance of the robot to perform the at least one additional reusable work primitive based on at least one result of repeatedly executing the processor-executable instructions to cause the first simulated instance of the robot to perform the at least one additional reusable work primitive.

Training the robot to autonomously perform each reusable work primitive in the library of reusable work primitives may include: receiving teleoperation instructions that cause the robot to perform a first reusable work primitive in the library of reusable work primitives; executing the teleoperation instructions to cause the robot to perform the first reusable work primitive in the library of reusable work primitives; and generating processor-executable instructions that cause the robot to replay the teleoperation instructions that cause the robot to perform the first reusable work primitive in the library of reusable work primitives. Receiving teleoperation instructions that cause the robot to perform a first reusable work primitive in the library of reusable work primitives may include receiving low-level teleoperation instructions that cause the robot to emulate real physical actions performed by a real teleoperation pilot. Receiving teleoperation instructions that cause the robot to perform a first reusable work primitive in the library of reusable work primitives may include receiving high-level teleoperation instructions that cause the robot to perform actions selected from a graphical user interface.

Training the robot to autonomously perform each reusable work primitive in the library of reusable work primitives may further include generating a simulated instance of the robot in a simulated environment. In this case: receiving teleoperation instructions that cause the robot to perform a first reusable work primitive in the library of reusable work primitives may include receiving teleoperation instructions that cause the simulated instance of the robot to perform the first reusable work primitive in the simulated environment; executing the teleoperation instructions to cause the robot to perform the first reusable work primitive in the library of reusable work primitives may include executing the teleoperation instructions to cause the simulated instance of the robot to perform the first reusable work primitive in the simulated environment; and generating processor-executable instructions that cause the robot to replay the teleoperation instructions that cause the robot to perform the first reusable work primitive in the library of reusable work primitives may include generating processor-executable instructions that cause the simulated instance of the robot to replay the teleoperation instructions that cause the simulated instance of the robot to perform the first reusable work primitive in the simulated environment. Receiving teleoperation instructions that cause the simulated instance of the robot to perform the first reusable work primitive in the simulated environment may include receiving low-level teleoperation instructions that cause the simulated instance of the robot to emulate real physical actions performed by a real teleoperation pilot. Receiving teleoperation instructions that cause the simulated instance of the robot to perform the first reusable work primitive in the simulated environment may include receiving high-level teleoperation instructions that cause the simulated instance of the robot to perform actions selected from a graphical user interface.

In some implementations, receiving teleoperation instructions that cause the robot to perform a first reusable work primitive in the library of reusable work primitives may include receiving a first set of teleoperation instructions that cause the robot to perform a first instance of the first reusable work primitive in the library of reusable work primitives and receiving a second set of teleoperation instructions that cause the robot to perform a second instance of the first reusable work primitive in the library of reusable work primitives. Executing the teleoperation instructions to cause the robot to perform the first reusable work primitive in the library of reusable work primitives may include executing the first set of teleoperation instructions to cause the robot to perform the first instance of the first reusable work primitive in the library of reusable work primitives and executing the second set of teleoperation instructions to cause the robot to perform the second instance of the first reusable work primitive in the library of reusable work primitives. Generating processor-executable instructions that cause the robot to replay the teleoperation instructions that cause the robot to perform the first reusable work primitive in the library of reusable work primitives may include: evaluating respective results of executing the first set of teleoperation instructions to cause the robot to perform the first instance of the first reusable work primitive in the library of reusable work primitives and executing the second set of teleoperation instructions to cause the robot to perform the second instance of the first reusable work primitive in the library of reusable work primitives to determine which of the first set of teleoperation instructions and the second set of teleoperation instructions produces a better result; and generating processor-executable instructions that cause the robot to replay whichever of the first set of teleoperation instructions and the second set of teleoperation instructions that produces the better result. Generating processor-executable instructions that cause the robot to replay the teleoperation instructions that cause the robot to perform the first reusable work primitive in the library of reusable work primitives may include combining at least one element of the first set of teleoperation instructions and at least one element of the second set of teleoperation instructions in the processor-executable instructions that cause the robot to replay the teleoperation instructions that cause the robot to perform the first reusable work primitive in the library of reusable work primitives.

Training the robot to autonomously perform each reusable work primitive in the library of reusable work primitives may include generating processor-executable instructions that, when executed by at least one processor of the robot, cause the robot to autonomously perform each reusable work primitive in the library of reusable work primitives, and the method may further include delivering the processor-executable instructions to a non-transitory processor-readable storage medium of the robot.

A robot may be summarized as including: a body; at least one physically actuatable component mechanically coupled to the body; at least one processor communicatively coupled to the at least one physically actuatable component; and at least one non-transitory processor-readable storage medium communicatively coupled to the at least one processor, the at least one non-transitory processor-readable storage medium storing a library of reusable work primitives and processor-executable instructions that, when executed by at least one processor, cause the robot to selectively and autonomously perform each reusable work primitive in the library of reusable work primitives, the processor-executable instructions trained by a process comprising: generating a first simulated instance of the robot in a simulated environment; repeatedly executing processor-executable instructions to cause the first simulated instance of the robot to perform a first reusable work primitive in the library of reusable work primitives; refining the processor-executable instructions that cause the first simulated instance of the robot to perform the first reusable work primitive based on at least one result of repeatedly executing the processor-executable instructions to cause the first simulated instance of the robot to perform the first reusable work primitive; and delivering the processor-executable instructions to the non-transitory processor-readable storage medium of the robot. The process by which the processor-executable instructions are trained may further include: generating at least one additional simulated instance of the robot in the simulated environment; repeatedly executing processor-executable instructions to cause the at least one additional simulated instance of the robot to perform the first reusable work primitive in the library of reusable work primitives; and refining the processor-executable instructions that cause both the first simulated instance of the robot and the at least one additional simulated instance of the robot to perform the first reusable work primitive based on at least one result of repeatedly executing the processor-executable instructions to cause the first simulated instance of the robot and the at least one additional simulated instance of the robot to perform the first reusable work primitive.

A computer program product may be summarized as including: a library of reusable work primitives; and processor-executable instructions and/or data that, when the computer program product is stored in a non-transitory processor-readable storage medium of a robot system and executed by at least one processor of the robot system, the at least one processor communicatively coupled to the non-transitory processor-readable storage medium, cause the robot system to selectively and autonomously perform each reusable work primitive in the library of reusable work primitives, the processor-executable instructions trained by a process comprising: generating a first simulated instance of the robot in a simulated environment; repeatedly executing processor-executable instructions to cause the first simulated instance of the robot to perform a first reusable work primitive in the library of reusable work primitives; refining the processor-executable instructions that cause the first simulated instance of the robot to perform the first reusable work primitive based on at least one result of repeatedly executing the processor-executable instructions to cause the first simulated instance of the robot to perform the first reusable work primitive; and delivering the processor-executable instructions to the non-transitory processor-readable storage medium of the robot. The process by which the processor-executable instructions are trained may further include: generating at least one additional simulated instance of the robot in the simulated environment; repeatedly executing processor-executable instructions to cause the at least one additional simulated instance of the robot to perform the first reusable work primitive in the library of reusable work primitives; and refining the processor-executable instructions that cause both the first simulated instance of the robot and the at least one additional simulated instance of the robot to perform the first reusable work primitive based on at least one result of repeatedly executing the processor-executable instructions to cause the first simulated instance of the robot and the at least one additional simulated instance of the robot to perform the first reusable work primitive.

BRIEF DESCRIPTION OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
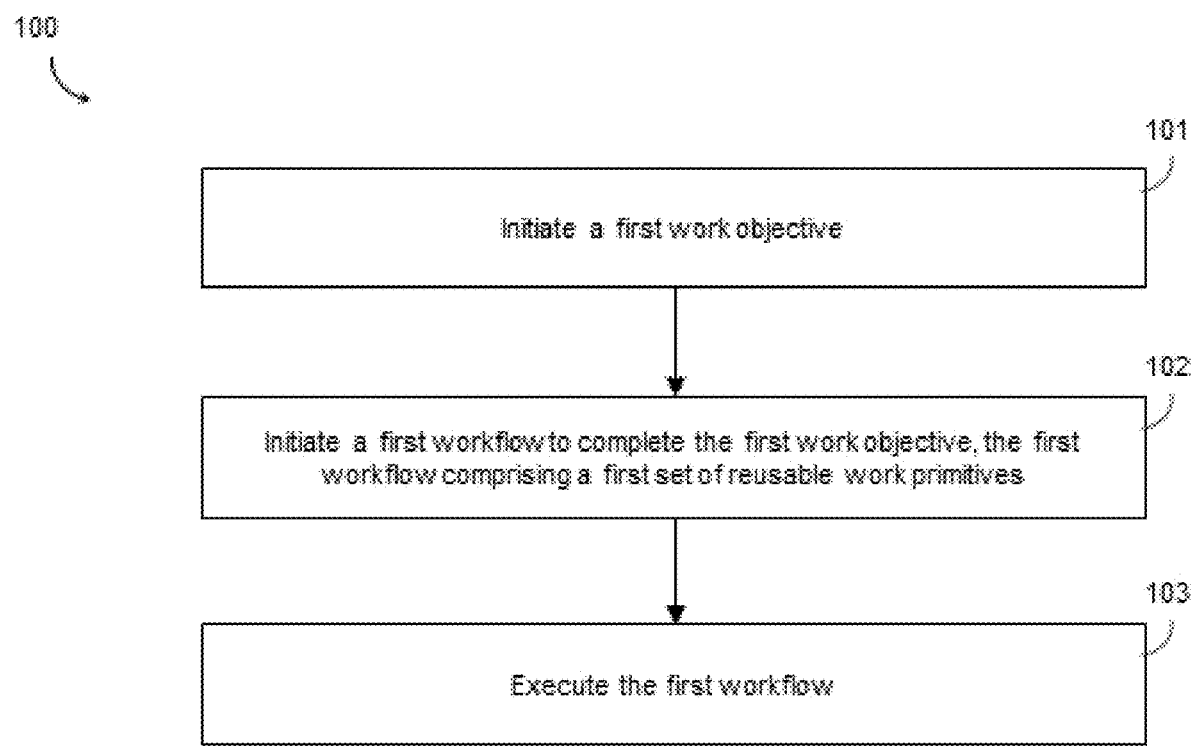
FIG. 1 is a flow diagram showing an exemplary method of operation of a robot in accordance with the present systems, devices, and methods.

The following description sets forth specific details in order to illustrate and provide an understanding of the various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

A general purpose robot is able to complete multiple different work objectives. As used throughout this specification and the appended claims, the term "work objective" refers to a particular task, job, assignment, or application that has a specified goal and a determinable outcome, often (though not necessarily) in the furtherance of some economically valuable work. Work objectives exist in many aspects of business, research and development, commercial endeavors, and personal activities. Exemplary work objectives include, without limitation: cleaning a location (e.g., a bathroom) or an object (e.g., a bathroom mirror), preparing a meal, loading/unloading a storage container (e.g., a truck), taking inventory, collecting one or more sample(s), making one or more measurement(s), building or assembling an object, destroying or disassembling an object, delivering an item, harvesting objects and/or data, and so on. The various implementations described herein provide systems, devices, and methods for initializing, configuring, training, operating, and/or deploying a robot to at least semi-autonomously complete multiple different work objectives.

In accordance with the present systems, devices, and methods, a work objective is deconstructed or broken down into a "workflow" comprising a set of "work primitives", where successful completion of the work objective involves performing each work primitive in the workflow. Depending on the specific implementation, completion of a work objective may be achieved by (i.e., a workflow may comprise): i) performing a corresponding set of work primitives sequentially or in series; ii) performing a corresponding set of work primitives in parallel; or iii) performing a corresponding set of work primitives in any combination of in series and in parallel (e.g., sequentially with overlap) as suits the work objective and/or the robot performing the work objective. Thus, in some implementations work primitives may be construed as lower-level activities, steps, or sub-tasks that are performed or executed as a workflow in order to complete a higher-level work objective.

Advantageously, and in accordance with the present systems, devices, and methods, a library of "reusable" work primitives may be defined. A work primitive is reusable if it may be generically invoked, performed, employed, or applied in the completion of multiple different work objectives. For example, a reusable work primitive is one that is common to the respective workflows of multiple different work objectives. In some implementations, a reusable work primitive may include at least one variable that is defined upon or prior to invocation of the work primitive. For example, "pick up *object*" may be a reusable work primitive where the process of "picking up" may be generically performed at least semi-autonomously in furtherance of multiple different work objectives and the *object* to be picked up may be defined based on the specific work objective being pursued.

As stated previously, the various implementations described herein provide systems, devices, and methods to enable a robot to at least semi-autonomously complete multiple different work objectives. Unless the specific context requires otherwise, the term "autonomously" is used throughout this specification and the appended claims to mean "without control by another party" and the term "semi-autonomously" is used to mean "at least partially autonomously." In other words, throughout this specification and the appended claims, the term "semi-autonomously" means "with limited control by another party" unless the specific context requires otherwise. An example of a semi-autonomous robot is one that can independently and/or automatically execute and control some of its own low-level functions, such as its mobility and gripping functions, but relies on some external control for high-level instructions such as what to do and/or how to do it.

In accordance with the present systems, devices, and methods, a library of reusable work primitives may be defined, identified, developed, or constructed such that any given work objective across multiple different work objectives may be completed by executing a corresponding workflow comprising a particular combination and/or permutation of reusable work primitives selected from the library of reusable work primitives. Once such a library of reusable work primitives has been established, one or more robot(s) may be trained to autonomously or automatically perform each individual reusable work primitive in the library of reusable work primitives without necessarily including the context of: i) a particular workflow of which the particular reusable work primitive being trained is a part, and/or ii) any other reusable work primitive that may, in a particular workflow, precede or succeed the particular reusable work primitive being trained. In this way, a semi-autonomous robot may be operative to autonomously or automatically perform each individual reusable work primitive in a library of reusable work primitives and only require instruction, direction, or guidance from another party (e.g., from an operator, user, or pilot) when it comes to deciding which reusable work primitive(s) to perform and/or in what order. In other words, an operator, user, or pilot may provide a workflow consisting of reusable work primitives to a semi-autonomous robot and the semi-autonomous robot may autonomously or automatically execute the reusable work primitives according to the workflow to complete a work objective. For example, a semi-autonomous humanoid robot may be operative to autonomously look left when directed to look left, autonomously open its right end effector when directed to open its right end effector, and so on, without relying upon detailed low-level control of such functions by a third party. Such a semi-autonomous humanoid robot may autonomously complete a work objective once given instructions regarding a workflow detailing which reusable work primitives it must perform, and in what order, in order to complete the work objective. Furthermore, in accordance with the present systems, devices, and methods, a robot may operate fully autonomously if it is trained or otherwise configured to analyze a work objective and independently define a corresponding workflow itself by deconstructing the work objective into a set of reusable work primitives from a library of reusable work primitives that the robot is operative to autonomously perform.

In the context of a robot, reusable work primitives may correspond to basic low-level functions that the robot is operable to (e.g., autonomously or automatically) perform and that the robot may call upon or execute in order to achieve something. Examples of reusable work primitives for a humanoid robot include, without limitation: look up, look down, look left, look right, move right arm, move left arm, close right end effector, open right end effector, close left end effector, open left end effector, move forward, turn left, turn right, move backwards, and so on; however, a person of skill in the art will appreciate that: i) the foregoing list of exemplary reusable work primitives for a humanoid robot is by no means exhaustive; ii) the present systems, devices, and methods are not limited in any way to robots having a humanoid form factor; and iii) the complete composition of any library of reusable work primitives depends on the design and functions of the specific robot for which the library of reusable work primitives is constructed.

A robot may be operative to perform any number of high-level functions based at least in part on its hardware and software configurations. For example, a robot with legs or wheels may be operative to move, a robot with a gripper may be operative to pick things up, and a robot with legs and a gripper may be operative to displace objects. The performance of any such high-level function generally requires the controlled execution of multiple low-level functions. For example, a mobile robot must exercise control of a number of different lower-level functions in order to controllably move, including control of mobility actuators (e.g., driving its legs or wheels) that govern functional parameters like speed, trajectory, balance, and so on. In accordance with the present systems, devices, and methods, the high-level functions that a robot is operative to perform are deconstructed or broken down into a set of basic components or constituents, referred to throughout this specification and the appended claims as "work primitives". Unless the specific context require otherwise, work primitives may be construed as the building blocks of which higher-level robot functions are constructed As will be discussed in more detail later on, in some implementations training a robot to autonomously perform a reusable work primitive may be completed in a simulated environment. Once a robot has been trained to autonomously perform a library of reusable work primitives, teleoperation of the robot by a remote pilot may be abstracted to the level of reusable work primitives; i.e., a remote operator or pilot that controls the robot through a teleoperation system may do so by simply instructing the robot which reusable work primitive(s) to perform and, in some implementations, in what order to perform them, and the robot may have sufficient autonomy or automation (resulting from, for example, the training described above) to execute a complete work objective based on such limited control instruction from the pilot.

As described previously, "clean a bathroom mirror" is an illustrative example of a work objective that can be deconstructed into a set of work primitives to achieve a goal and for which the outcome is determinable. The goal in this case is a clean bathroom mirror, and an exemplary set of work primitives (or workflow) that completes the work objective is as follows:

| Work Primitive Index | Work Primitive |
| --- | --- |
| 1 | Locate cleaning solution |
| 2 | Grasp the cleaning solution |
| 3 | Locate mirror |
| 4 | Aim the cleaning solution at the mirror |
| 5 | Dispense the cleaning solution onto the mirror |
| 6 | Locate the cleaning cloth |
| 7 | Grasp the cleaning cloth |
| 8 | Pass the cleaning cloth over the entire surface of the mirror |
| 9 | Return to ready |

A person of skill in the art will appreciate that the exemplary workflow above, comprising nine work primitives, is used as an illustrative example of a workflow that may be deployed to complete the work objective of cleaning a bathroom mirror; however, in accordance with the present systems, devices, and methods the precise definition and composition of each work primitive and the specific combination and/or permutation of work primitives selected/executed to complete a work objective (i.e., the specific construction of a workflow) may vary in different implementations. For example, in some implementations work primitives 3, 4, and 5 above (i.e., locate mirror, aim the cleaning solution at the mirror, and dispense the cleaning solution onto the mirror) may all be combined into one higher-level work primitive as "spray cleaning solution on the mirror" whereas in other implementations those same work primitives may be broken down into additional lower-level work primitives as, for example:

Locate the mirror
Identify the boundaries of the mirror
Aim the cleaning solution at a first location within the boundaries of the mirror
Squeeze the cleaning solution
Aim the cleaning solution at a second location within the boundaries of the mirror
Squeeze the cleaning solution
Etc.

Based on the above example and description, a person of skill in the art will appreciate that the granularity of work primitives may vary across different implementations of the present systems, devices, and methods. Furthermore, in accordance with the present systems, devices, and methods the work primitives are advantageously "reusable" in the sense that each work primitive may be employed, invoked, applied, or "reused" in the performance of more than one overall work objective. For example, while cleaning a bathroom mirror may involve the work primitive "grasp the cleaning solution," other work objectives may also use the "grasp the cleaning solution" work primitive, such as for example "clean the toilet," "clean the window," and/or "clean the floor." In some implementations, work primitives may be abstracted to become more generic. For example, "grasp the cleaning solution" may be abstracted to "grasp the spray bottle" or "grasp the *object1*" where the *object1* variable is defined as "*object1*=spray bottle", and "locate the mirror" may be abstracted to "locate the object that needs to be sprayed" or simply "locate *object2*" where "*object2*=mirror". In such cases, the "grasp the spray bottle" work primitive may be used in tasks that do not involve cleaning, such as "paint the wall" (where the spray bottle=spray paint), "style the hair" (where the spray bottle=hairspray), or "prepare the stir-fry meal" (where the spray bottle=cooking oil spray).

FIG. 1 is a flow diagram showing an exemplary method 100 of operation of a robot in accordance with the present systems, devices, and methods. In general, throughout this specification and the appended claims, a method of operation of a robot is a method in which at least some, if not all, of the various acts are performed by the robot. For example, certain acts of a method of operation of a robot may be performed by at least one processor or processing unit (hereafter "processor") of the robot communicatively coupled to a non-transitory processor-readable storage medium of the robot and, in some implementations, certain acts of a method of operation of a robot may be performed by peripheral components of the robot that are communicatively coupled to the at least one processor, such as one or more physically actuatable components (e.g., arms, legs, end effectors, grippers, hands), one or more sensors (e.g., optical sensors, audio sensors, tactile sensors, haptic sensors), mobility systems (e.g., wheels, legs), communications and networking hardware (e.g., receivers, transmitters, transceivers), and so on. The non-transitory processor-readable storage medium of the robot may store data (including, e.g., a library of reusable work primitives) and/or processor-executable instructions that, when executed by the at least one processor, cause the robot to perform the method and/or cause the at least one processor to perform those acts of the method that are performed by the at least one processor. The robot may communicate, via communications and networking hardware communicatively coupled to the robot's at least one processor, with remote systems and/or remote non-transitory processor-readable storage media. Thus, unless the specific context requires otherwise, references to a robot's non-transitory processor-readable storage medium, as well as data and/or processor-executable instructions stored in a non-transitory processor-readable storage medium, are not intended to be limiting as to the physical location of the non-transitory processor-readable storage medium in relation to the at least one processor of the robot and the rest of the robot hardware. In other words, a robot's non-transitory processor-readable storage medium may include non-transitory processor-readable storage media located on-board the robot and/or non-transitory processor-readable storage media located remotely from the robot, unless the specific context requires otherwise.

Returning to FIG. 1, method 100 includes three acts 101, 102, and 103, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 101, the robot initiates a first work objective. In some implementations, the robot may initiate the first work objective in response to receiving instructions from another party, such as verbal instructions from a remote or local controller or operator. In some implementations, the robot may include a telecommunication interface communicatively coupled to the at least one processor and the initiation, by the robot, of the first work objective at 101 may include receiving, by the telecommunication interface of the robot (e.g., from a remote operator or tele-operation system), instructions related to the first work objective. Such instructions may include a definition of the first work objective, parameters dictating how/when/where the first work objective should be completed, and/or directions on how to carry out the first work objective. In other implementations, the initiation, by the robot, of the first work objective at 101 may include the robot itself autonomously identifying the first work objective. In such implementations, the non-transitory processor-readable storage medium of the robot may store data, models, policies, paradigms, algorithms, frameworks, architectures, and/or processor-executable instructions (collectively, "artificial intelligence") that, when executed by the at least one processor of the robot, cause the robot to autonomously identify the first work objective. The artificial intelligence may autonomously identify the first work objective based on a range of different parameters and/or criteria, including without limitation: sensor data, environmental factors, internal parameters, observations, and/or communications with other systems, robots, devices, or people.

At 102, the robot initiates a first workflow to complete the first work objective initiated at 101. Initiating, by the robot, the first workflow may include identifying or defining a first set or combination of reusable work primitives that, when performed by the robot, will complete the first work objective. Initiating, by the robot, the first workflow may further include sequencing or otherwise arranging the first set or combination of reusable work primitives into a first permutation of the first combination of reusable work primitives. As previously described, in some implementations the non-transitory processor-readable storage medium of the robot may store a library of reusable work primitives, and in such implementations the first workflow initiated by the robot at 102 may comprise, or consist of, a first set or combination of reusable work primitives selected from the library of reusable work primitives stored in the non-transitory processor-readable storage medium of the robot.

When the robot includes a telecommunication interface communicatively coupled to the at least one processor, the initiation, by the robot, of the first workflow at 102 may include receiving the first workflow, or instructions related thereto, by the telecommunication interface of the robot (e.g., from a remote operator or tele-operation system). Such instructions may include a definition of the first workflow, including for example a set or combination of reusable work primitives and, optionally, a permutation of the set or combination of reusable work primitives to complete the first work objective. In other implementations, the initiation, by the robot, of the first workflow at 102 may include the robot itself autonomously identifying a first set, combination, and/or permutation of reusable work primitives that make up the first workflow. In such implementations, the non-transitory processor-readable storage medium of the robot may store artificial intelligence that, when executed by the at least one processor of the robot, causes the robot to autonomously identify the first workflow.

At 103, the robot executes the first workflow initiated at 102. Generally, in executing the first workflow at 103, the robot executes the first set of reusable work primitives selected from the library of reusable work primitives in the initiation of the first workflow at 102. As previously described, in some implementations the robot may be trained, configured, or otherwise operable to perform each reusable work primitive in the library of reusable work primitives substantially autonomously or automatically. For example, the non-transitory processor-readable storage medium of the robot may store respective sets of processor-executable instructions that, when executed by the at least one processor of the robot, each cause the robot to autonomously perform a respective one of the reusable work primitives in the library of work primitives. Thus, when the robot executes the first workflow at 103, the robot may do so substantially autonomously or automatically by executing the sets of processor-executable instructions that cause or enable the robot to autonomously perform the particular reusable work primitives in the first set of reusable work primitives that correspond to the first workflow. For the purpose of illustration, an exemplary implementation of method 100 is now described.

As an example, a robot may include or access a non-transitory processor-readable storage medium that stores: i) a library of five reusable work primitives: A, B, C, D, and E; and ii) five respective sets of processor-executable instructions inst(A), inst(B), inst(C), inst(D), and inst(E) that, when executed by at least one processor of the robot, each cause the robot to autonomously perform a respective one of the first reusable work primitives. At 101 of method 100, the robot initiates a first work objective (either autonomously or upon receiving instructions as described previously). At 102 of method 100, the robot initiates a first workflow to complete the first work objective (either autonomously or upon receiving instructions as previously described). The first workflow comprises, or consists of, a first set of reusable work primitives from the library of reusable work primitives arranged in a first order. In this example, the first workflow consists of reusable work primitives B, C, and D arranged as:

C->B->D

At 103, the robot autonomously executes the first workflow. That is, at least one processor of the robot executes processor-executable instructions inst(C) to cause the robot to autonomously perform reusable work primitive C, then at least one processor of the robot executes processor-executable instructions inst(B) to cause the robot to autonomously perform reusable work primitive B, then at least one processor of the robot executes processor-executable instructions inst(D) to cause the robot to autonomously perform reusable work primitive D. In this way, the robot completes the work objective: semi-autonomously if the robot relies on receiving instructions in order to define the first workflow at 102, or completely autonomously if the robot is operable to autonomously define the first workflow at 102.

Advantageously, in accordance with the present systems, devices, and methods, the library of reusable work primitives stored or accessed by the robot may comprise, or consist of, all of the genericized activities, steps, or sub-tasks necessary to enable the robot to complete a multitude of different work objectives. In this way, the present systems, devices, and methods may realize, or at least approximate, general purpose robots that are capable of completing a wide range of different work objectives in a wide range of different industries.

Continuing the example above, the exemplary library of five reusable work primitives may, for example, comprise:
A: measure environmental data
B: move to *position_x*
C: pick up *object_i*
D: put down *object_j*
E: barcode scan *object_k*

And the first work objective may be stated as: "move the green box to the storage room". Thus, when the robot performs the first workflow C->B->D, the robot: executes inst(C) where *object_i*="green box" which causes the robot to autonomously (i.e., with no further control or instruction from another party) pick up the green box; executes inst(B) where *position_x*="storage room" which causes the robot to autonomously carry the green box to the storage room; and executes inst(D) where *object_j*="green box" which causes the robot to autonomously put down the green box in the storage room. In this way, the robot completes the first work objective by performing the workflow C->B->D.

Using the same library of five reusable work primitives A, B, C, D, and E, the robot may complete a second work objective. For example, a second work objective may be stated as: "make an inventory of the items in the storage room". As previously described, the second work objective may be initialized by the robot (per act 101 of method 100) either autonomously or in response to receiving instructions related to the second work objective from some form of controller or operator. The controller/operator may include a remote tele-operator, an at least semi-autonomous tele-operation system, or a controlling entity (e.g., another robot, or a person) co-located with the robot. A controlling entity co-located with the robot may provide verbal instructions to the robot that the robot is operative to detect and process.

Upon initiation of the second work objective, the robot may initiate a second workflow to complete the second work objective. In a similar way to the first workflow, the second workflow also comprises, or consists of, a set of reusable work primitives from the library of five reusable work primitives A, B, C, D, and E; however, the second workflow is different from the first workflow in that the second workflow comprises a second, and different, set (e.g., combination and/or permutation) of reusable work primitives from the library of five reusable work primitives A, B, C, D, and E. As previously described, the second workflow may be initialized by the robot (per act 102 of method 100) either autonomously or in response to receiving instructions defining the second workflow from some form of controller or operator.

In this example, the second workflow consists of reusable work primitives B, C, D, E arranged as:

B->repeat:[C->E->D]

In accordance with the present systems, devices, and methods, at least one reusable work primitive may be common in multiple workflows. In the present example, reusable work primitives B, C, and D are all commonly included in both the first workflow to complete the first work objective and the second workflow to complete the second work objective.

The exemplary second workflow includes "repeat:[C->E->D]"; therefore, in order to complete the second work objective the robot must repeat primitives C->E->D of the second workflow for all items in the storage room. Thus, when the robot executes the second workflow B->repeat:[C->E->D] (per act 103 of method 100), the robot executes inst(B) where *position_x*="storage room" which causes the robot to autonomously (i.e., with no further control or instruction from another party) go to the storage room and then the robot initiates a loop wherein the robot executes primitives C->E->D for all items in the storage room. That is, upon arriving in the storage room, the robot: executes inst(C) where *object_i*="first item" which causes the robot to autonomously pick up a first item in the storage room; executes inst(E) where *object_k*="first item" which causes the robot to autonomously bar code scan the first item; and executes inst(D) where *objectj*="first item" which causes the robot to put down the first item. The robot then repeats primitives C->E->D for each item in the storage room in series (i.e., for a second item, for a third item, and so on) until the robot has picked up, bar code scanned, and put down every item in the storage room. In this way, the robot completes the second work objective by performing the workflow B->repeat:[C->E->D].

Using the same library of five reusable work primitives A, B, C, D, and E, the robot may complete at least one additional work objective. For example, the robot may record environmental parameters at various stations or waypoints (repeat:[B->A]) and/or checkout customers' purchases at a retail store (repeat:[C->E->D]). These, and many other, work objectives may all be completed by the robot at least semi-autonomously by executing corresponding workflows comprising, or consisting of, various combinations and/or permutations of reusable work primitives from an exemplary library of five reusable work primitives A, B, C, D, and E. However, a person of skill in the art will appreciate that a library of reusable work primitives may consist of any number and form of reusable work primitives and the library of five reusable work primitives A, B, C, D, and E described herein is used only as an example for the purpose of illustration. Generally, the more reusable work primitives in a library of reusable work primitives the more different work objectives a robot may be operable to semi-autonomously complete; however, in some implementations a finite number of reusable work primitives (e.g., on the order of 10s, such as 10, 20, 30, 40, 50, 60, 70, 80, 90; or on the order of 100s, such as 100, 200, etc.) may be sufficient to enable a robot to complete a significant portion (e.g., all) of the work objectives of interest.

Figure 2:
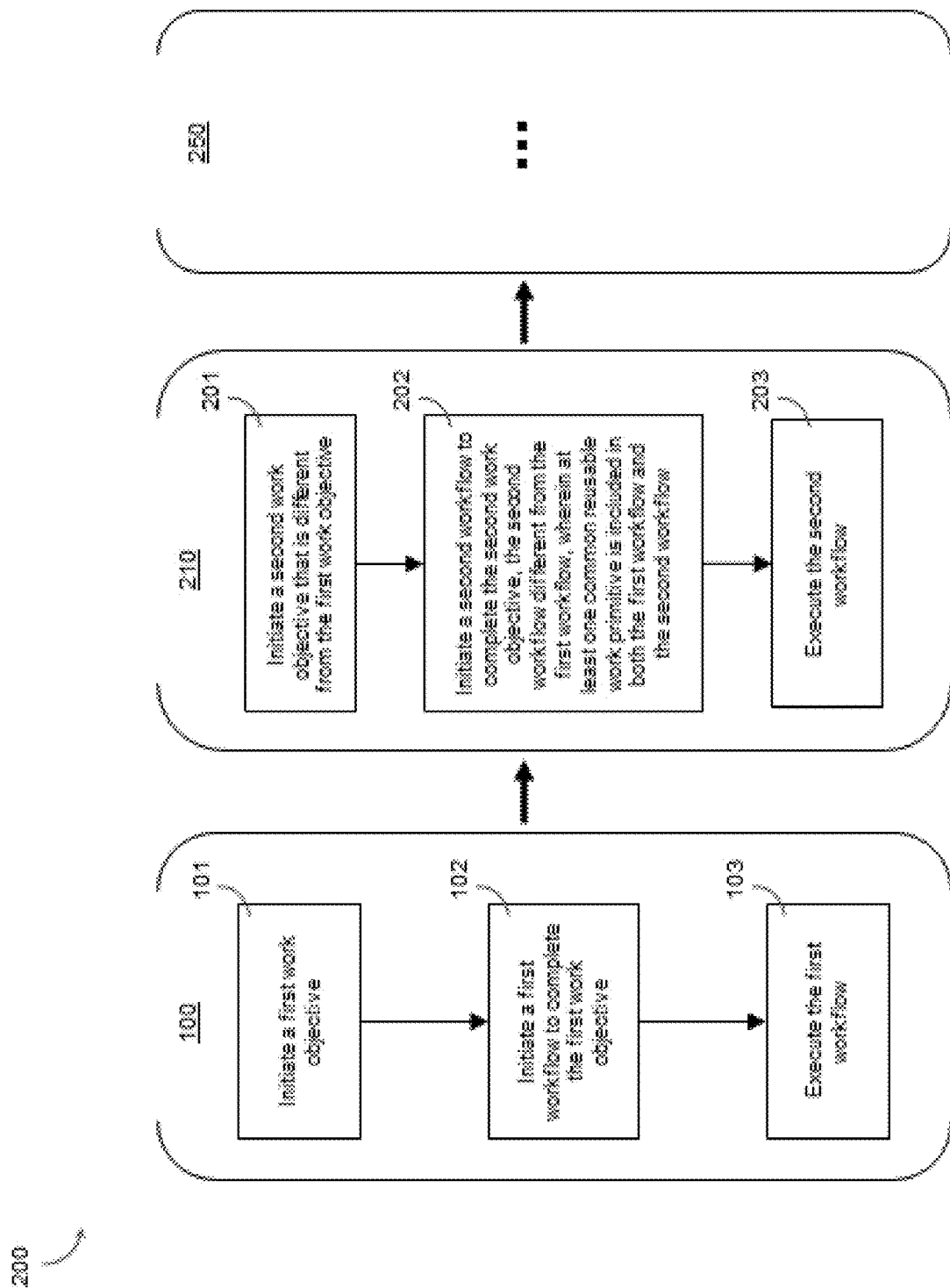
FIG. 2 is a flow diagram showing another exemplary method of operation of a robot in accordance with the present systems, devices, and methods.

The example described above, where a robot employs a fixed library of reusable work primitives to complete multiple different work objectives, is illustrated in FIG. 2. FIG. 2 is a flow diagram showing an exemplary method 200 of operation of a robot in accordance with the present systems, devices, and methods. Method 200 includes three sub-methods 100, 210, and 250 and six illustrated acts 101, 102, 103, 201, 202, and 203, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

Method 200 includes, as a sub-method 100, method 100 of operation of a robot to complete a first work objective from FIG. 1. That is, method 200 includes acts 101, 102, and 103 from method 100 of FIG. 1, whereby the robot initiates a first work objective (101), initiates a first workflow to complete the first work objective (102), and executes the first workflow (103) all substantially as described for method 100 of FIG. 1. As described previously, the first workflow comprises, or consists of, a particular combination and/or permutation of reusable work primitives from a library of reusable work primitives stored in or otherwise accessed by the robot. In accordance with method 100, various ones of the reusable work primitives in the robot's library of reusable work primitives are sufficient to enable the robot to complete the first work objective. In sub-method 210, various ones of the reusable work primitives in the robot's library of reusable work primitives are used and/or reused by the robot to complete a second work objective via acts 201, 202, and 203 (collectively, sub-method 210), and likewise various ones of the reusable work primitives in the robot's library of reusable work primitives are used and/or reused by the robot to complete at least one additional work objective at sub-method 250.

Specifically, at 201 of sub-method 210 the robot initiates a second work objective that is different from the first work objective initiated at 101 of sub-method 100. Similar to as described for act 101, at 201 the second work objective may be initiated autonomously by the robot or in response to instructions received from another party (e.g., a controller, pilot, or operator) through any of a variety of different communication means, including verbally, wirelessly through a telecommunications system, digitally through a tethered communication line, and so on.

At 202 of sub-method 210, the robot initiates a second workflow to complete the second work objective initiated at 201. Since the second work objective is different from the first work objective, the second workflow may be different from the first workflow. Similar to as described for act 102, at 202 initiating, by the robot, the second workflow may include identifying or defining a second set or combination of reusable work primitives that, when performed by the robot, will complete the second work objective, and may further include (if applicable) sequencing or otherwise arranging the second set or combination of reusable work primitives into a second permutation of the second combination of reusable work primitives. In accordance with the present systems, devices, and methods, the second set or combination of reusable work primitives to complete the second work objective is selected, at 202, from the same library of reusable work primitives from which the first set or combination of reusable work primitives to complete the first work objective is selected at 102. In some implementations, at least one common reusable work primitive may be included in both the first workflow initiated at 102 and the second workflow initiated at 202. In other words, in some implementations at least one reusable work primitive from the first workflow initiated at 102 is reused in the second workflow initiated at 202.

Similar to act 102, at 202 the robot may initiate the second workflow autonomously or in response to receiving instructions from another party (e.g., a controller, pilot, or operator) through any of a variety of different communication means, including verbally, wirelessly through a telecommunications system, digitally through a tethered communication line, and so on.

At 203 of sub-method 210, the robot executes the second workflow initiated at 202. Generally, in executing the second workflow at 203, the robot executes the second set of reusable work primitives selected from the library of reusable work primitives in the initiation of the second workflow at 202, including (if applicable) at least one common reusable work primitive that is included in both the first workflow (initiated at 102 and executed at 103) and the second workflow (initiated at 202 and executed at 203). As previously described, in some implementations the robot may be trained, configured, or otherwise operable to perform each reusable work primitive in the library of reusable work primitives substantially autonomously or automatically. Thus, when the robot executes the second workflow at 203, the robot may do so substantially autonomously or automatically by executing the processor-executable instructions that cause or enable the robot to autonomously perform the particular reusable work primitives in the second set of reusable work primitives that correspond to the second workflow. In implementations where both the first workflow initiated at 102 and the second workflow initiated at 202 include at least one common reusable work primitive, executing the first workflow at 103 and executing the second workflow at 203 may both include executing, by at least one processor of the robot, at least a same portion of processor-executable instructions that cause the robot to perform the at least one common reusable work primitive in both the first workflow and the second workflow.

In accordance with the present systems, devices, and methods, various ones of the reusable work primitives in the robot's library of reusable work primitives may be further used and/or reused by the robot to complete at least one additional work objective. To this end, method 200 includes sub-method 100 where a robot initiates and executes a first set of reusable work primitives to complete a first work objective, sub-method 210 where the robot initiates and executes a second set of reusable work primitives to complete a second work objective that is different from the first work objective, and sub-method 250 (details not illustrated to reduce clutter but are generally analogous to acts 101, 102, and 103 of sub-method 100 and acts 201, 202, and 203 of sub-method 210) where the robot initiates and executes at least one additional set of reusable work primitives to complete at least one additional work objective that is different from both the first work objective and the second work objective. In each of sub-methods 100, 210, and 250, the same robot is deployed using the same library of reusable work primitives; however, because the first work objective, the second work objective, and the at least one additional work objective are all different from one another, the corresponding workflows (i.e., the first workflow, the second workflow, and the at least one additional workflow, respectively) initiated by the robot to complete the work objectives may all be different from another. In accordance with the present systems, devices, and methods, the work primitives in the robot's library of work primitives are reusable such that any or all of the following is/are true: i) at least one work primitive that is included in the first workflow to complete the first work objective is also included in (i.e., is common to or "reused" in) the second workflow to complete the second work objective; ii) at least one work primitive that is included in the second workflow to complete the second work objective is also included in (i.e., is common to or "reused" in) the at least one additional workflow to complete the at least one additional work objective; iii) at least one work primitive that is included in the at least one additional workflow to complete the at least one additional work objective is also included in (i.e., is common to or reused in) the first workflow to complete the first work objective; and/or iv) at least one work primitive that is included in the first workflow to complete the first work objective is also included in (i.e., is common to or reused in) both the second workflow to complete the second work objective and the at least one additional workflow to complete the at least one additional work objective. In the latter scenario, at least one reusable work primitive is included in (i.e., is common to or reused in) all of the first workflow, the second workflow, and the at least one additional workflow.

A robot may come in a variety of different forms and include a variety of different components. A robot may include a body or chassis that includes, houses, carries, or is otherwise mechanically coupled to, as previously described, at least one processor communicatively coupled to at least one non-transitory processor-readable storage medium. Advantageously, a robot may also include at least one physically actuatable component mechanically coupled to the body and communicatively coupled to the at least one processor, the at least one physically actuatable component operable to controllably move and effect changes in, on, or to the robot and/or the robot's environment. Throughout this specification and the appended claims, the term "physically actuatable component" refers to a real physical part of a robot that is controllably actuatable (e.g., by the robot, or by an operator, controller or pilot of the robot) to change in some physical way involving motion (including, without limitation, translation and/or rotation). Non-limiting examples of physically actuatable components include: an arm, an end effector, a gripper, a hand, a finger, a leg, an extendible and/or displaceable support structure such as a neck or boom, and a wheel.

In accordance with the present systems, devices, and methods, when a robot includes at least a first physically actuatable component, the library of reusable work primitives stored in (e.g., the at least one non-transitory processor-readable storage medium of the robot) or otherwise accessed by the robot may include a set of reusable work primitives performable by at least the first physically actuatable component. That is, the robot's library of reusable work primitives may include specific reusable work primitives that are each performable by at least the first physically actuatable component.

The completion of some work objectives may advantageously deploy a robot's first physically actuatable component, e.g., in order to effect a change on the robot and/or its environment. In this case, when the robot initiates a workflow to complete a work objective per act 102 of method 100 and/or act 202 of (sub-method 210 of) method 200, the robot may initiate a first set of reusable work primitives that includes at least one reusable work primitive from the set of reusable work primitives performable by the first physically actuatable component. When the robot executes the workflow, the robot executes or performs the at least one reusable work primitive from the set of reusable work primitives performable by the first physically actuatable component, which results in the first physically actuatable component actuating to effect a change on the robot or the robot's environment in some deliberate way characterized by the at least one reusable work primitive performable by the first physically actuatable component. A specific example of the above for which the at least one physically actuatable component is or includes a component (e.g., end effector) operative to grasp objects, such as a gripper or hand, is illustrated in FIG. 3.

Figure 3:
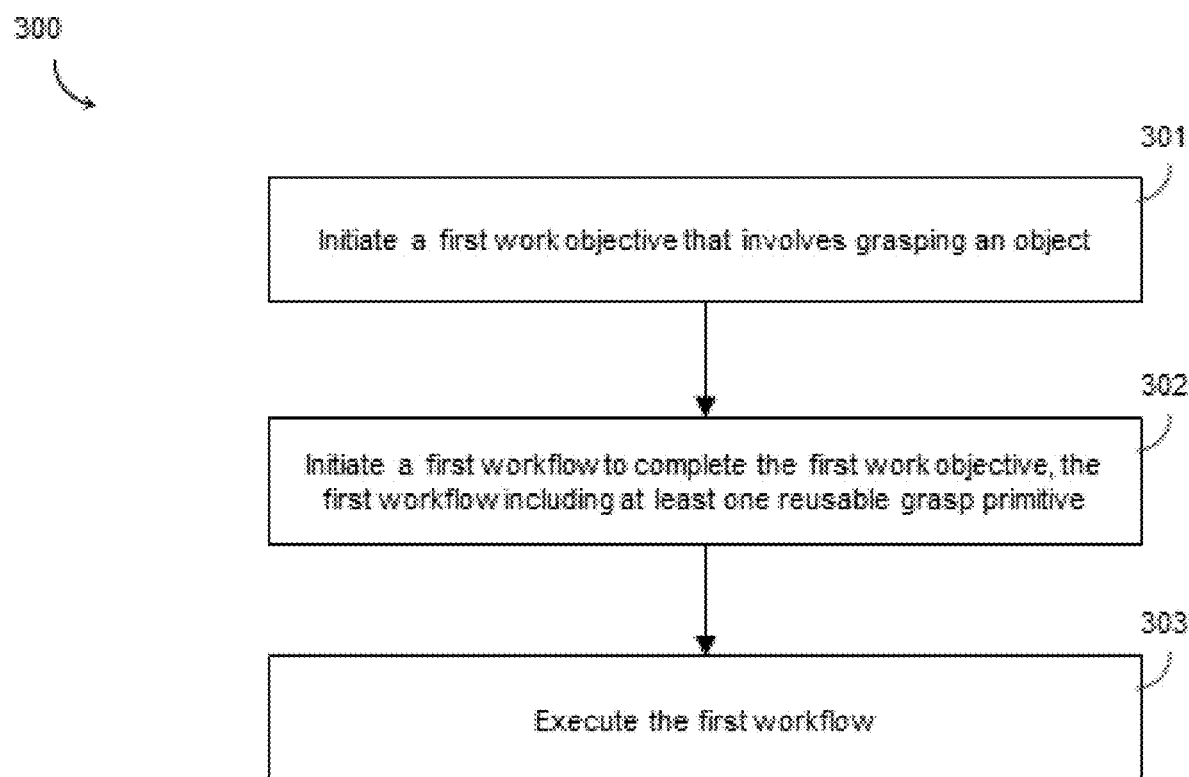
FIG. 3 is a flow diagram showing another exemplary method of operation of a robot in accordance with the present systems, devices, and methods.

FIG. 3 is a flow diagram showing an exemplary method 300 of operation of a robot in accordance with the present systems, devices, and methods. In order to perform method 300, the robot includes at least a first physically actuatable component operative to grasp objects and the robot's library of reusable work primitives includes a set of reusable grasp primitives performable by the at least a first physically actuatable component that is operative to grasp objects. Method 300 includes three acts 301, 302, and 303, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

Method 300 is substantially similar to method 100, with an added detail that the first work objective to be completed by the robot specifically includes grasping an object. Thus, at 301 of method 300 the robot initiates (in a manner similar to that described for act 101 of method 100) a first work objective that involves grasping an object. As non-limiting examples, the first work objective may involve picking up an object, displacing an object, pulling an object, twisting or rotating an object, holding onto an object (such as a tool or instrument), and/or otherwise manipulating an object At 302, the robot initiates (in a manner similar to that described for act 102 of method 100) a first workflow to complete the first work objective. In accordance with the present systems, devices, and methods, in the example of method 300 the first workflow includes at least one reusable grasp primitive from the robot's available library of reusable work primitives, the at least one reusable grasp primitive to be performed by the first physically actuatable component operative to grasp objects. Throughout this specification, the term "grasp primitive" refers to a particular configuration adopted by a physically actuatable component operative to grasp objects in order to grasp an object in a particular way. For example, when the physically actuatable component operative to grasp objects is or includes a hand having multiple fingers and a thumb (i.e., an analogue of a human hand), different grasp primitives may correspond to different arrangements or configurations of the fingers and thumb when grasping an object. Such a hand-like physically actuatable component operative to grasp objects may be best suited to grasp different objects in different ways depending on, among other things, an intended use of the object and/or characteristics (e.g., shape, size, geometry, rigidity, fragility) of the object. Certain "different ways" that grasping may be achieved may correspond to respective grasp primitives, with various non-limiting examples depicted in FIG. 4.

Figure 4:
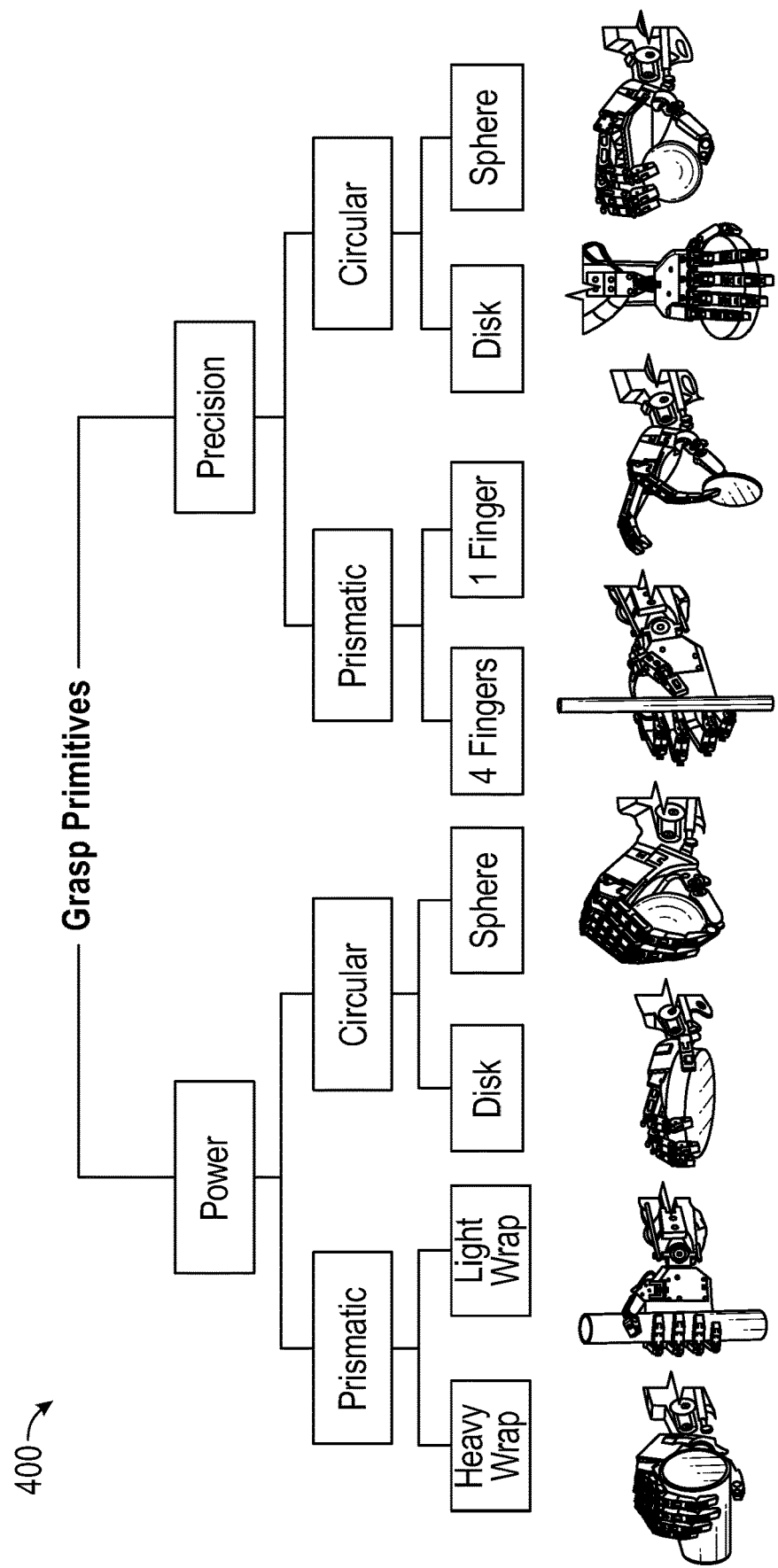
FIG. 4 is an illustrative diagram showing an exemplary set of reusable grasp primitives in accordance with the present systems, devices, and methods.

FIG. 4 is an illustrative diagram showing an exemplary set of reusable grasp primitives 400 in accordance with the present systems, devices, and methods. For exemplary set of reusable grasp primitives 400, the physically actuatable component operative to grasp objects is a robotic hand having four fingers and an opposable thumb (much like a human hand) and the grasp primitives correspond to different hand configurations each respectively suited to grasp in a different way. A person of skill in the art will appreciate, however, that the teachings herein may be applied in alternative implementations in which a hand-like physically actuatable component operative to grasp objects includes a different number of fingers, such as two fingers, three fingers, five fingers, six fingers, and so on.

In FIG. 4, the grasp primitives 400 are broken down into two high-level categories: "Power" and "Precision", where "Power" grasp primitives provide strong grips well-suited for, e.g., grasping strong rigid objects or in applications in which a highly secure hold is desired, while "Precision" grasp primitives provide gentle grips well-suited for, e.g., grasping delicate soft objects or in applications in which a highly manipulative hold is desired. The Power and Precision grasp primitive categories are each further broken down into sub-categories based on the geometry of the object being grasped (e.g., Prismatic or Circular) and the configuration/arrangement of the hand's fingers and thumb (e.g., Heavy Wrap, Light Wrap, Disk, Sphere, 4 Fingers, 1 Finger). In this way, exemplary set of reusable grasp primitives 400 includes eight unique grasp primitives that may be autonomously deployed by a hand-like physically actuatable component operative to grasp objects in accordance with the present systems, devices, and methods. A person of skill in the art will appreciate, however, that exemplary set of eight reusable grasp primitives 400 in FIG. 4 is provided for illustrative purposes only and in practice a reusable set of grasp primitives may comprise, or consist of, any number and combination of grasp primitives depending on the specific implementation, including: a subset of the eight reusable grasp primitives 400 shown in FIG. 4, either alone or in combination with at least one additional reusable grasp primitive not shown in FIG. 4; all eight reusable grasp primitives 400 shown in FIG. 4 plus at least one additional reusable grasp primitive not shown in FIG. 4; or a completely different set of reusable grasp primitives that does not include any of the eight reusable grasp primitive 400 shown in FIG. 4. Furthermore, in different implementations a set of reusable grasp primitives may follow an organizational structure that is different from that depicted in FIG. 4, or a set of reusable grasp primitives may follow no organizational structure at all.

Returning to method 300 of FIG. 3, at 303 the robot executes (in a manner similar to that described for act 103 of method 100) the first workflow initiated at 302. In the execution of the first workflow at 303, the first physically actuatable component operative to grasp objects executes or performs the at least one reusable grasp primitive to grasp an object in a particular way (e.g., Heavy Wrap or 1 Finger) that is well-suited to the object or work objective. Executing or performing the first workflow at 303 completes the first work objective.

Figure 5:
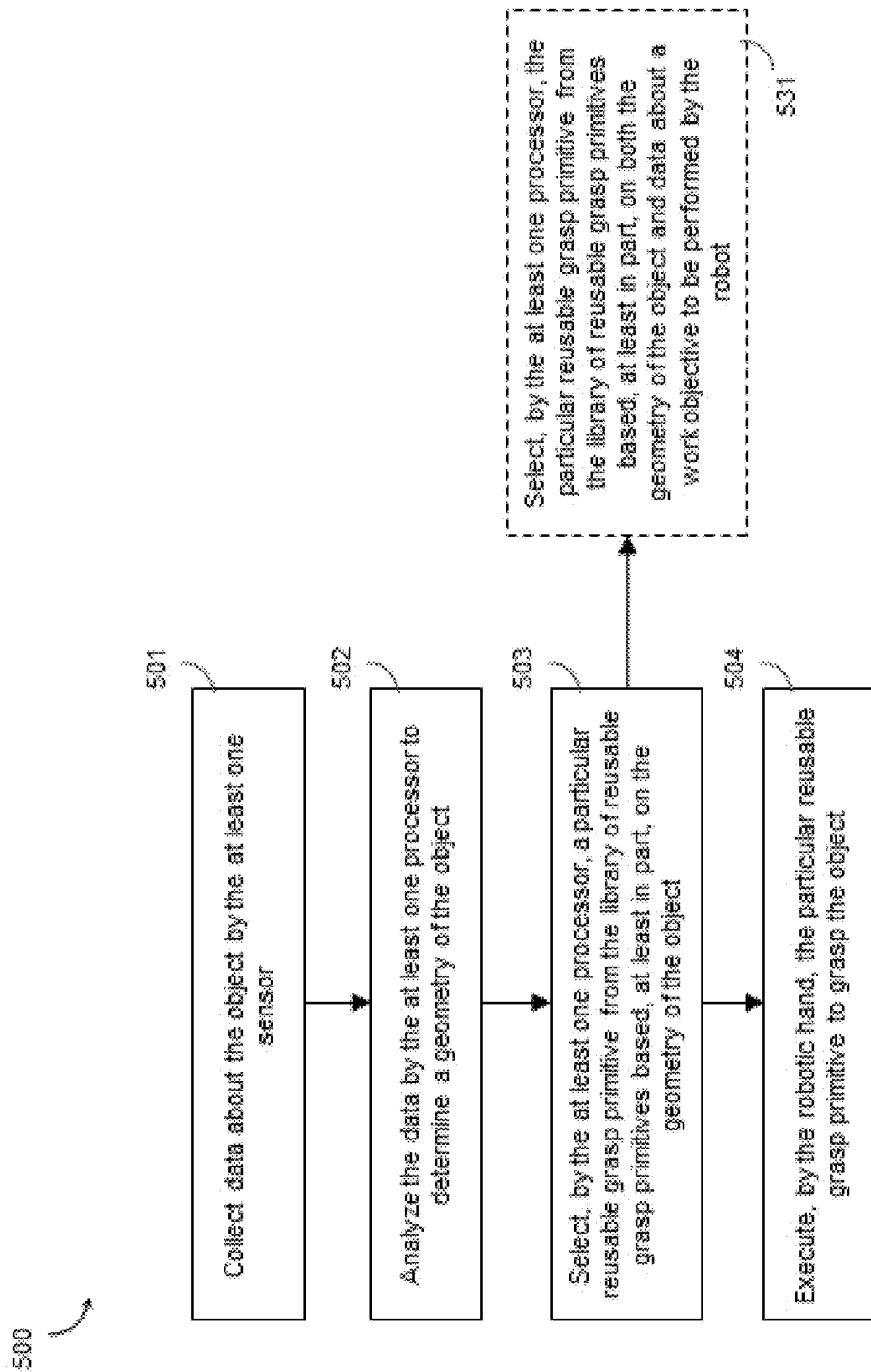
FIG. 5 is a flow diagram showing an exemplary method of operation of a robot to grasp an object in accordance with the present systems, devices, and methods.

FIG. 5 is a flow diagram showing an exemplary method 500 of operation of a robot to grasp an object in accordance with the present systems, devices, and methods. In order to perform method 500, the robot includes a robotic hand having multiple fingers and an opposable thumb, at least one processor operative to control actuations of the robotic hand, at least one sensor communicatively coupled to the at least one processor, and a non-transitory processor-readable storage medium communicatively coupled to the at least one processor. The non-transitory processor-readable storage medium stores a library of reusable grasp primitives and processor-executable instructions that, when executed by the at least one processor, cause the robotic hand to autonomously perform the reusable grasp primitives in the library of reusable grasp primitives. Method 500 includes four acts

501, 502, 503, and 504, and one sub-act 531, though those of skill in the art will appreciate that in alternative implementations certain acts and/or sub-acts may be omitted and/or additional acts and/or sub-acts may be added. Those of skill in the art will also appreciate that the illustrated order of the acts and/or sub-acts is shown for exemplary purposes only and may change in alternative implementations.

At 501, the at least one sensor collects data about the object. In some implementations, the at least one sensor may include at least one optical sensor, such as at least one camera, and at 501 the at least one optical sensor may collect optical data, such as at least one image, about the object. In some implementations, the at least one sensor may include at least one haptic or tactile sensor and at 501 the at least one haptic or tactile sensor may collect haptic or tactile data about the object. Some sensor systems deployed at 501 may include signal emitters, such as LiDAR systems or other scanner systems based on, for example, radio frequencies.

At 502, the data collected by the at least one sensor at 501 is analyzed by the at least one processor to determine a geometry of the object. When the at least one sensor employed at 501 includes at least one optical sensor, a person of skill in the art will appreciate that the analysis performed at 502 may employ any of a wide range of machine vision and/or digital image processing techniques, including without limitation: stitching/registration; filtering (e.g. morphological filtering); thresholding; pixel counting; segmentation; edge detection; color analysis; blob detection and extraction; neural net/deep learning/machine learning processing; pattern recognition including template matching; and/or gauging/metrology.

At 503, the at least one processor selects a particular reusable grasp primitive from the library of reusable grasp primitives based, at least in part, on the geometry of the object determined at 502. The particular reusable grasp primitive that the at least one processor selects may, in some implementations, be or include the particular reusable grasp primitive that the processor determines best fits (or will best fit) the geometry of the object relative to (or compared to) all other reusable grasp primitives in the library of reusable grasp primitives. As an example, the particular reusable grasp primitive that "best fits" the geometry of the object may be the particular reusable grasp primitive that employs a configuration of the multiple fingers and the opposable thumb of the robotic hand that best accommodates or mates with the geometry of the object relative to all other reusable grasp primitives in the library of reusable grasp primitives.

In some implementations, in order to select a particular reusable grasp primitive at 503, the at least one processor may simulate or model the robotic hand grasping the object (given the geometry of the object determined at 502) with each reusable grasp primitive in the library of reusable grasp primitives to determine which particular reusable grasp primitive in the library of reusable grasp primitives best fits the geometry of the object relative to the other grasp primitives in the library of reusable grasp primitives. The simulation/modeling process may include assigning a respective score to each reusable grasp primitive in the library of reusable grasp primitives based on how well the reusable grasp primitive fits, accommodates, or mates with the geometry of the object and/or how reliable a grasp is or will be achieved. In implementations that employ such a scoring system, the at least one processor may return or select the reusable grasp primitive that has the highest score as the particular reusable grasp primitive that best fits the geometry of the object relative to all other reusable grasp primitives in the library of reusable grasp primitives. In some implementations, the at least one processor may initially (i.e., prior to modeling or simulating grasping the object with the robotic hand) filter out reusable grasp primitives that are less likely to provide a good fit based on properties of the object or task for which the object needs to be grasped, such as (for example) whether a power or prismatic grasp is preferred. For example, with reference to FIG. 4, if the object is known to be solid and heavy, and the geometry of the object is determined (at 502) to be long and cylindrical, then the at least one processor may filter the reusable grasp primitives such that only reusable grasp primitives that correspond to "Prismatic" and "Power" grasps are modeled and/or simulated.

In some implementations, modeling and/or simulating may not be employed and at 503 the at least one processor may select the particular reusable grasp primitive based purely on deductions or process of elimination filtering similar to that described above. That is, returning again to FIG. 4, if the object is known to light and fragile and the geometry of the object is determined (at 502) to be spherical, the at least one processor may filter the library of reusable grasp primitives accordingly based on these properties to select the "Precision->Circular->Sphere" reusable grasp primitive at 503.

At 504, the robotic hand executes the particular reusable grasp primitive selected by the at least one processor at 503 in order to grasp the object. In some implementations, the robotic hand may be controlled by the at least one processor and at 504 the at least one processor may execute processor-executable instructions that cause the robotic hand to autonomously perform the particular reusable grasp primitive to grasp the object.

As illustrated in some of the foregoing examples, in some implementations the at least one processor may select, at 503, a particular reusable grasp primitive from the library of reusable grasp primitives based on both the geometry of the object determined at 502 and at least one additional parameter of the object (e.g., such as whether the object is heavy or light, or whether the object is strong/durable or fragile/brittle, and so on). Thus, in some implementations of method 500 the at least one processor may analyze additional data about the object to determine at least one additional parameter of the object. Such additional data may be collected by the at least one sensor (i.e., either using the same sensor that collects data about the object at 501 or using a different sensor of the same or a different sensor type) or delivered/transmitted to the robot from an external source (e.g., from a pilot or other operator of the robot). For example, the robot may include at least one receiver communicatively coupled to the at least one processor that may receive, among other things, additional data about the object. The additional data about the object may come in a variety of different forms depending on the specific implementation. As examples, the additional data about the object may include any of the following, alone or in any combination: a hardness of the object, a rigidity of the object, an identity of the object, a function of the object, and/or a mass of the object.

A robot may be operative to perform method 500 (i.e., to grasp an object) as part of a workflow. That is, the act or action of grasping an object may correspond to one or more reusable work primitives executed by a robot as part of a workflow in furtherance of a work objective. In accordance with the present systems, devices, and methods, the particular reusable grasp primitive selected by the robot at 503 may, in some implementations, depend on or be influenced by, at least in part, what the robot will do with the grasped object in furtherance of a work objective. For example, if the robot will need to swing the object or use it as a tool then the robot may adopt a "Power" grasp primitive to ensure a secure grasp of the object, whereas if the robot will need to pick and place the object then the robot may adopt a "Precision" grasp primitive to ensure precise placement of the object. Thus, in some implementations of method 500, act 503 may include sub-act 531. At 531, the robot (e.g., the at least one processor of the robot) selects the particular reusable grasp primitive from the library of reusable grasp primitives based, at least in part, on both the geometry of the object determined at 502 and information about a work objective to be performed by the robot. Information about the work objective to be performed by the robot may be stored as data in the non-transitory processor-readable storage medium of the robot and accessed by the at least one processor when selecting the reusable grasp primitive at 503. Data about the work objective to be performed by the robot may arrive at or in the non-transitory processor-readable storage medium of the robot through a variety of different means, including without limitation: via instruction or command received (e.g., by at least one receiver of the robot) from a pilot or operator of the robot; via instruction or command received locally (e.g., by a microphone or input terminal of the robot) from a pilot or operator of the robot; and/or via autonomous action planning and/or reasoning performed by an artificial intelligence of the robot.

In accordance with the present systems, methods, and devices, a robot may autonomously perform each reusable grasp primitive in a library of reusable grasp primitives. More generally, a robot may autonomously perform each reusable work primitive in a library of reusable work primitives. Such autonomy may be developed or enabled by a training or learning process that involves causing the robot to repeatedly perform a reusable grasp/work primitive for a number of iterations. A person of skill in the art will already be familiar with the concept of training a robot to complete a work objective by operating the robot to replay a complete set of instructions that achieves the work objective (i.e., operating the robot to replay an entire workflow); however, in accordance with the present systems, methods, and devices this conventional approach of operating a robot to replay a complete set of instructions corresponding to an entire workflow is undesirably specific and limiting. A robot that is trained to autonomously perform an entire workflow is a highly specialized robot that can only autonomously complete work objective(s) that correspond to that workflow. Even minor changes to conditions, the environment, or the specification of the work objective can render such a highly specialized robot incapable of autonomously completing the work objective. Conversely, the present systems, methods, and devices describe autonomous "general purpose" robots where such generality arises, at least in part, from each robot's ability to autonomously perform individual work primitives (rather than only complete workflows) and to "reuse" such work primitives across a multitude of different workflows corresponding to a wide range of different work objectives. Thus, training a robot to autonomously perform reusable work primitives is different from training a robot to autonomously perform an entire workflow and advantageously gives rise to a generality that enables multi-purpose robot applications. In other words, training a robot to autonomously perform reusable work primitives as opposed to training a robot to autonomously perform complete workflows improves the function of the robot in terms of its versatility, generality, and range of utility.

Figure 6:
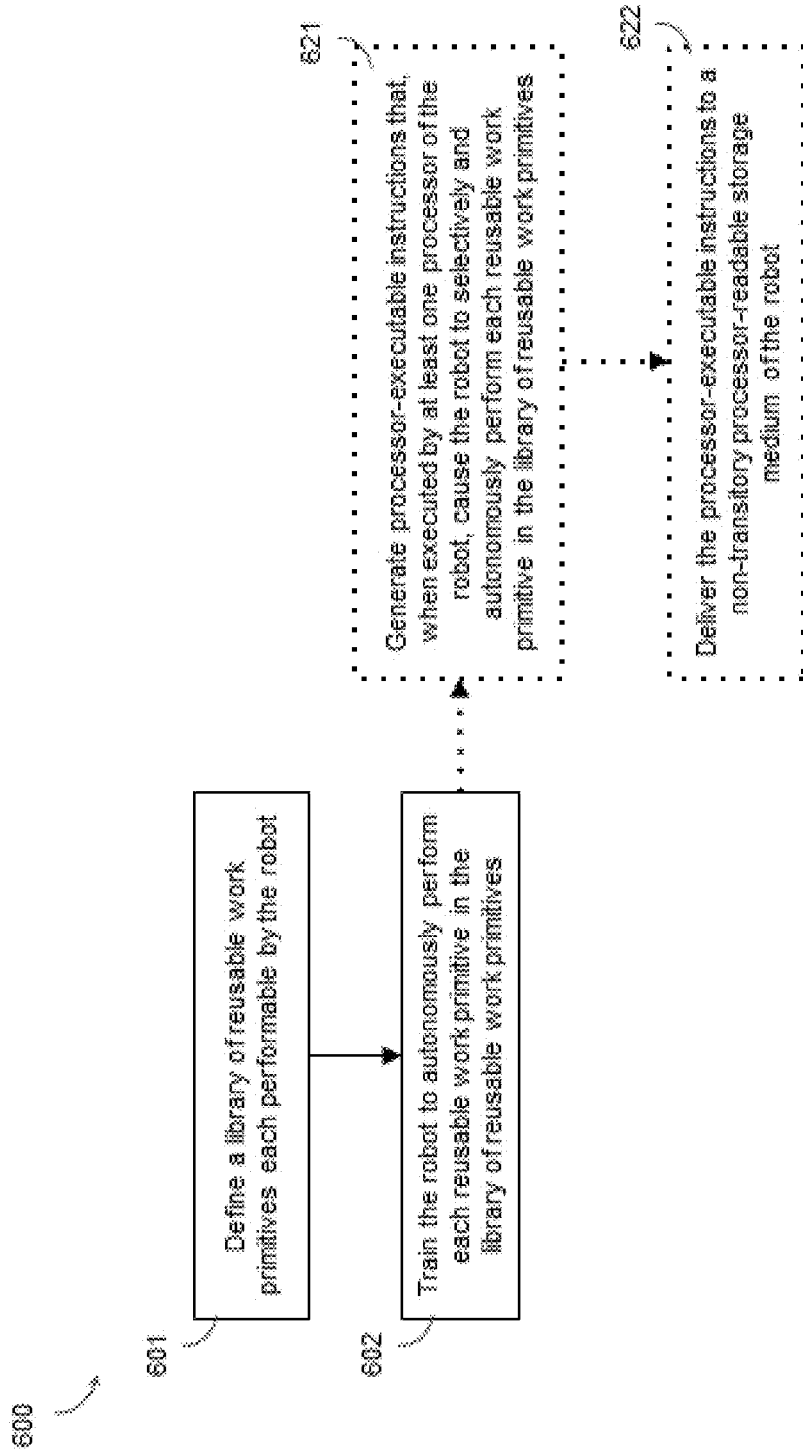
FIG. 6 is a flow diagram showing an exemplary computer-implemented method of initializing a robot to complete a multitude of work objectives in accordance with the present systems, devices, and methods.

FIG. 6 is a flow diagram showing an exemplary computer-implemented method 600 of initializing a robot to complete a multitude of work objectives in accordance with the present systems, devices, and methods. Method 600 includes two main acts 601 and 602, and act 602 includes two sub-acts 621 and 622, though those of skill in the art will appreciate that in alternative implementations certain acts/sub-acts may be omitted and/or additional acts/sub-acts may be added. Those of skill in the art will also appreciate that the illustrated order of the acts/sub-acts is shown for exemplary purposes only and may change in alternative implementations. Method 600 is a computer-implemented method that may be performed by one or more computer system(s) comprising conventional computing hardware such as at least one processor communicatively coupled with at least one non-transitory processor-readable storage medium and various other well-known components such as a system bus, input/output peripherals, networking hardware, and so on, as well as conventional software and firmware stored in the non-transitory processor-readable storage medium such as BIOS, various drivers, an operating system, and the like. In accordance with the present systems, methods, and devices, the at least one non-transitory processor-readable storage medium may also store data and/or processor-executable instructions (e.g., a computer program product) that, when executed by the at least one processor communicatively coupled to the at least one non-transitory processor-readable storage medium, cause the computer system to perform computer-implemented method 600.

At 601, a library of reusable work primitives is defined. Each reusable work primitive is performable by the robot, wherein respective combinations and permutations of reusable work primitives from the library of reusable work primitives are initiated and executed by the robot in order to complete respective workflows in furtherance of respective work objectives.

At 602, the robot is trained to autonomously perform each reusable work primitive in the library of reusable work primitives. Training the robot to autonomously perform each reusable work primitive in the library of reusable work primitive may include, for each respective reusable work primitive in the library of reusable work primitives, operating the robot to repeatedly perform the reusable work primitive without any regard to, or allowance for, or accommodation of any other reusable work primitive that may precede or succeed the reusable work primitive in any workflow. In other words, while conventional techniques of training a robot to autonomously replay an entire workflow involve operating a robot to execute a series of instructions each serially dependent on preceding and succeeding instructions in order to complete a work objective, in the present systems, methods, and devices robots are trained to autonomously replay individual reusable work primitives by, for each individual reusable work primitive, executing an independent set of instructions that does not depend on preceding or succeeding instructions and does not on its own complete a work objective. This process of training the robot at 602 is illustrated in FIG. 6 as sub-acts 621 and 622.

At 621, training the robot at 602 may include generating processor-executable instructions that, when executed by at least one processor of the robot, cause the robot to selectively and autonomously perform each reusable work primitive in the library of reusable work primitives. Generating the processor-executable instructions may include an iterative process wherein, for each reusable work primitive, the robot is repeatedly operated to perform, and reperform, the reusable work primitive and, in so doing, those actions and control parameters (e.g., actuation timings, force and torque levels, and so on) that cause the robot to perform the reusable work primitive with the greatest success (e.g., with the fewest errors, in the least amount of time, with the greatest accuracy or precision, or by any other similar measure of success) may be encoded as processor-executable instructions that, when re-executed by the robot, cause the robot to selectively and autonomously reperform the reusable work primitive.

At 622, the processor-executable instructions generated at 621 are delivered to a non-transitory processor-readable storage medium of the robot. In other words, at 622 the processor-executable instructions generated at 621 are "loaded into" the robot to be called upon and played back by the robot to cause the robot to autonomously perform the reusable work primitives.

As described previously, in accordance with the present systems, methods, and devices training a robot to autonomously perform a reusable work primitive may be completed in a simulated environment. For example, training the robot at 602 may include training the robot to autonomously perform each reusable work primitive in the library of reusable work primitives in a simulated environment, as illustrated in FIG. 7.

Figure 7:
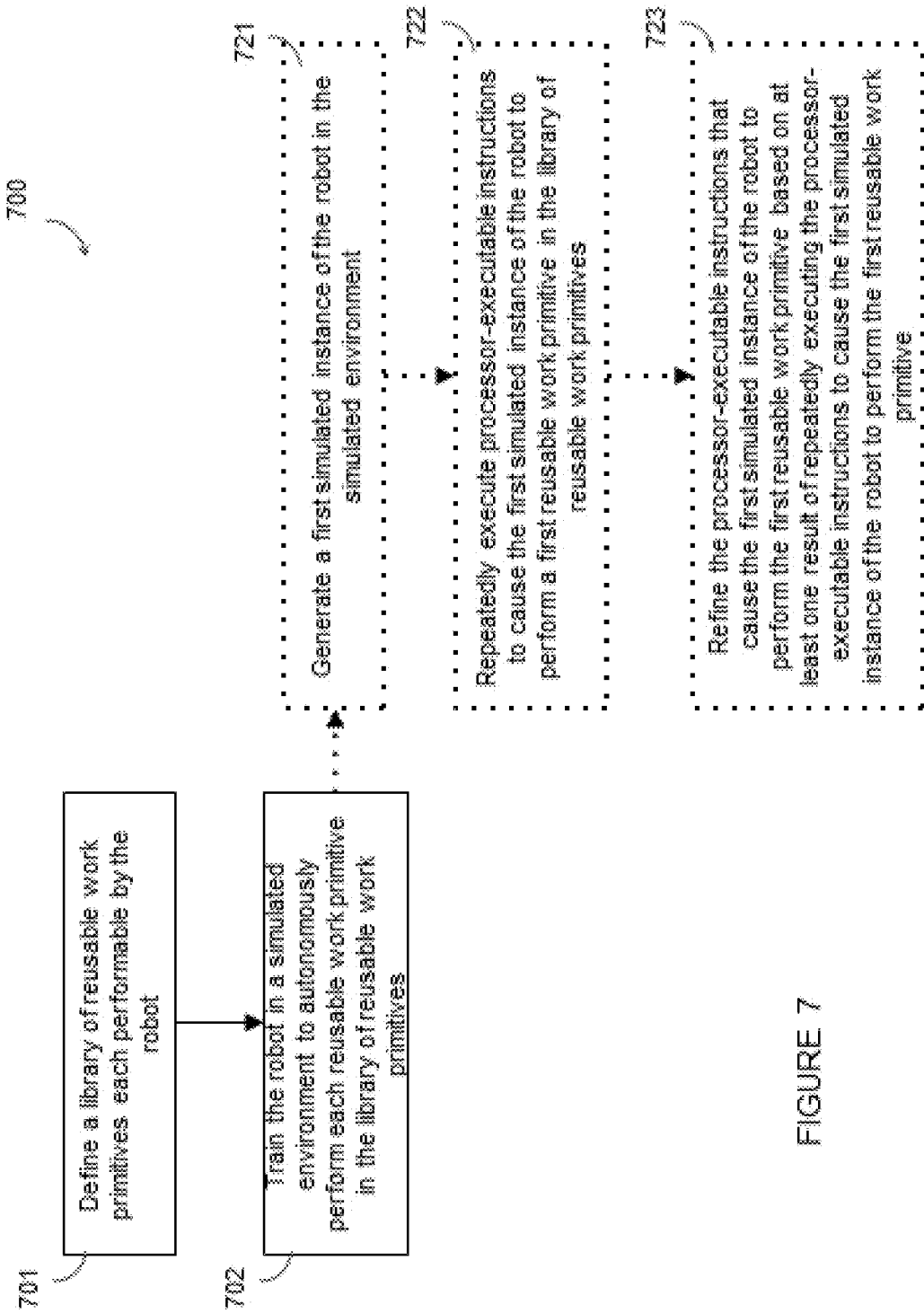
FIG. 7 is a flow diagram showing another exemplary computer-implemented method of initializing a robot to complete a multitude of work objectives in accordance with the present systems, devices, and methods.

FIG. 7 is a flow diagram showing an exemplary computer-implemented method 700 of initializing a robot to complete a multitude of work objectives in accordance with the present systems, devices, and methods. Method 700 includes two main acts 701 and 702, and act 702 includes three sub-acts 721, 722, and 723, though those of skill in the art will appreciate that in alternative implementations certain acts/sub-acts may be omitted and/or additional acts/sub-acts may be added. Those of skill in the art will also appreciate that the illustrated order of the acts/sub-acts is shown for exemplary purposes only and may change in alternative implementations. Method 700 is a computer-implemented method that may be performed by one or more computer system(s) comprising conventional computing hardware such as at least one processor communicatively coupled with at least one non-transitory processor-readable storage medium and various other well-known components such as a system bus, input/output peripherals, networking hardware, and so on, as well as conventional software and firmware stored in the non-transitory processor-readable storage medium such as BIOS, various drivers, an operating system, and the like. In accordance with the present systems, methods, and devices, the at least one non-transitory processor-readable storage medium may also store data and/or processor-executable instructions (e.g., a computer program product) that, when executed by the at least one processor communicatively coupled to the at least one non-transitory processor-readable storage medium, cause the computer system to perform computer-implemented method 700.

At 701, a library of reusable work primitives is defined similar to act 601 from method 600. Each reusable work primitive is performable by the robot.

At 702, the robot is trained in a simulated environment to autonomously perform each reusable work primitive in the library of reusable work primitives. Throughout this specification and the appended claims, the term "simulated" as in "simulated environment", "simulated instance" and the like, is used to refer to a virtual or digital copy or emulation of a physical counterpart. Thus, a "simulated environment" is a virtual or digital representation of a physical environment encoded in processor-executable instructions and/or data stored in at least one non-transitory processor-readable storage medium and realized by at least one processor executing such processor-executable instructions and/or data. The processor-executable instructions and/or data may encode dimensions (e.g., spatial parameters), geometries, and other parameters (e.g., physical constants such as acceleration due to gravity, speed of light, and so on) that characterize a space and, if applicable, any objects contained therein. A simulated environment may or may not represent a known real-world environment. In order to interface with a user, a simulated environment may be displayed on a screen or monitor but such a visual manifestation of a simulated environment is not necessarily required in all implementations of the present systems, methods, and devices. In some implementations, training the robot in a simulated environment may include training one or more simulation(s) of the robot in the simulated environment. To this end, act 702 includes sub-acts 721, 722, and 723.

At 721, which is a part of training the robot in a simulated environment at 702, a first simulated instance of the robot is generated in the simulated environment. A simulated instance of the robot may include a virtual or digital representation of the robot encoded in processor-executable instructions and/or data stored in at least one non-transitory processor-readable storage medium and realized by at least one processor executing such processor-executable instructions and/or data. The processor-executable instructions and/or data may encode dimensions (e.g., spatial parameters), geometries, and other parameters (e.g., degrees of freedom, material properties, mass, and so on) that characterize the real-world physical robot and, if applicable, how it moves. In order to interface with a user, a simulated instance of a robot may be displayed on a screen or monitor but such a visual manifestation of a simulated instance of a robot is not necessarily required in all implementations of the present systems, methods, and devices.

At 722, which is a part of training the robot in a simulated environment at 702, processor-executable instructions are repeatedly executed (by at least one processor) to cause the first simulated instance of the robot to perform a first reusable work primitive in the library of reusable work primitives.

At 723, which is a part of training the robot in a simulated environment at 702, the processor-executable instructions that are repeatedly executed at 722 are refined based on at least one result of repeatedly executing the processor-executable instructions to cause the first simulated instance of the robot to perform the first reusable work primitive at 722. For example, the processor-executable instructions that are repeatedly executed at 722 may be refined at 723 to adjust one or more parameters (e.g., a timing of or in between actuations, a force or precision of actuation, a target value or threshold value, a sensory trigger, and so on) that govern how the first simulated instance of the robot performs the first reusable work primitive to improve or reproduce a result of executing the processor-executable instructions at 722. If a first iteration of executing the processor-executable instructions to cause the first simulated instance of the robot to perform the first reusable work primitive at 722 produces a result that is deficient in some way (e.g., the first reusable work primitive is performed too slowly, with insufficient accuracy or precision, too quickly, with excessive accuracy or precision, or inconsistently with an expected outcome), then the instructions may be refined at 723 and then repeated (i.e., for a second iteration) at 722 to confirm that a more desirable result is achieved.

In some implementations, method 700 may be continued for any number of additional reusable work primitives in the library or reusable work primitives. Sub-acts 722 and 723 may be repeated for each reusable work primitive in the library of reusable work primitives. For example, additional processor-executable instructions may be repeatedly executed (i.e., at 722) to cause the first simulated instance of the robot to perform at least one additional reusable work primitive in the library of reusable work primitives, and the processor-executable instructions that cause the first simulated instance of the robot to perform the at least one additional reusable work primitive may be refined (i.e., at 723) based on at least one result of repeatedly executing the processor-executable instructions to cause the first simulated instance of the robot to perform the at least one additional reusable work primitive.

In accordance with the present systems, methods, and devices, training a robot to autonomously perform a reusable work primitive may be done in the real physical world using a real physical robot, or it may be done in a simulated world using a simulated instance of the robot. In either case, the same, or substantially similar, processor-executable instructions may be used to control or govern the actions of the real/simulated robot. An advantage of training a simulated instance of the robot in a simulated environment (as opposed to training a real physical robot in a real physical environment) is that doing so does not impose any wear and tear on the physical hardware of the real physical robot. As described above, the training process may involve causing the robot to repeatedly perform the reusable work primitive being trained, which can cause significant wear and tear on the robot hardware and reduce the functional lifespan of the robot before it is even able to be deployed to complete meaningful work. Furthermore, in the early stages of training, a robot may be so inept at performing a reusable work primitive that its early attempts at doing so could cause damage to itself or its surroundings. For example, the robot could cause itself to fall over or collide with objects in its environment. Training a simulated instance of the robot in a simulated environment avoids such risks to the real physical robot.

A further advantage of training a simulated instance of the robot in a simulated environment is that the training process may be accelerated by parallelization. In some implementations, any number of additional simulated instances of the robot may be generated in the simulated environment and trained in parallel alongside the first simulated instance of the robot. For example, some implementations of method 700 may further include generating at least one additional simulated instance of the robot in the simulated environment and repeatedly executing processor-executable instructions to cause the at least one additional simulated instance of the robot to perform the first reusable work primitive in the library of reusable work primitives alongside or in parallel with (or independently from) the first simulated instance of the robot. The processor-executable instructions that cause both the first simulated instance of the robot and the at least one additional simulated instance of the robot to perform the first reusable work primitive may be refined based on at least one result of repeatedly executing the processor-executable instructions to cause the first simulated instance of the robot and the at least one additional simulated instance of the robot to perform the first reusable work primitive. In some implementations, a single, common instance of processor-executable instructions may be executed by both/all simulated instances of the robot and refined based on the results across all simulated instances of the robot (e.g., each simulated instance of the robot may be operated to perform the same reusable work primitive with some controlled variation, such as to each grasp a respective different object); in other implementations, each simulated instance of the robot may execute a respective instance of the processor-executable instructions and each respective instance of the processor-executable instructions may be refined based on the results achieved with the corresponding simulated instance of the robot. In this latter scenario, the respective instances of processor-executable instructions may be compared after the refinement process and a global optimum instance of processor-executable instructions may be selected.

Training in simulation has the further advantage that it may be done continuously and without interruption for extended periods of time (i.e., without pauses or rests).

Figure 8:
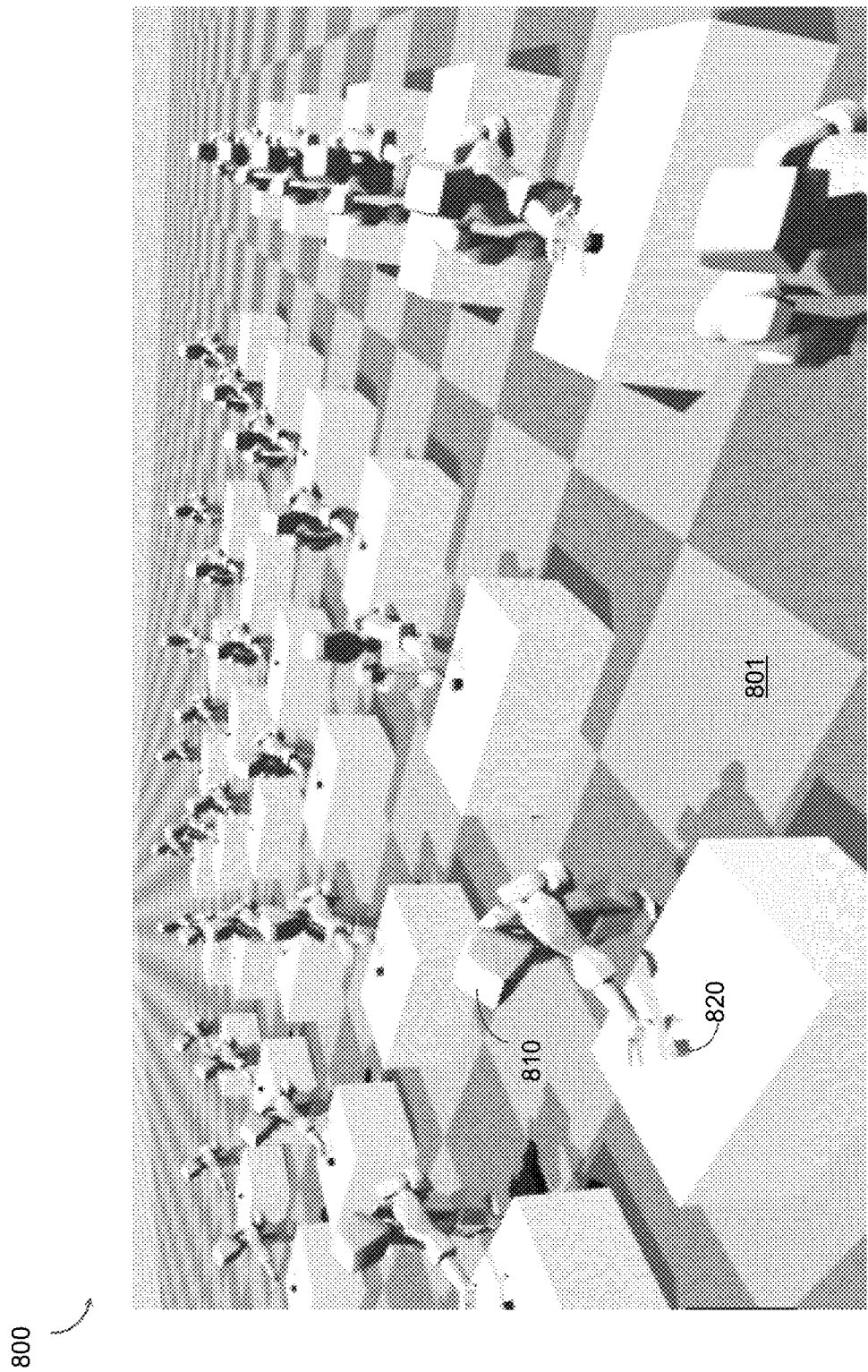
FIG. 8 is an illustrative diagram showing an exemplary simulated environment in which a robot is trained through simulation to perform a reusable work primitive in accordance with the present systems, methods, and devices.

FIG. 8 is an illustrative diagram showing an exemplary simulated environment 800 in which a robot is trained through simulation to perform a reusable work primitive in accordance with the present systems, methods, and devices. Simulated environment 800 includes a simple space having a flat ground 801 and is not based on any real-world space. Multiple simulated instances of a real-world robot are present in simulated environment 800, with only an exemplary first simulated instance 810 called out in FIG. 8 to reduce clutter. Each simulated instance of the robot 810 is repeatedly performing a particular reusable grasp primitive in order to grasp a respective object 820 (only one exemplary object 820 is called out in FIG. 8 to reduce clutter). In accordance with the present systems, methods, and devices, the simulated instances of the robot 810 are each training to autonomously perform a reusable work primitive and not a complete workflow, and parallelizing such training over multiple simulated instances can vastly expedite the training process compared to doing so with real physical robot hardware while at the same time mitigate any damages or wear and tear on real-world physical components or objects. Depending on the quality of the simulation, the same or substantially similar processor-executable instructions used to control the operation of the simulated instances of the robot 810 and trained to optimize autonomous performance of the reusable work primitive(s) may be ported from the simulation and loaded int eh real physical robot. In other words, provided that the simulated instances of the robot 810 and the simulated environment 800 are sufficiently representative of the real-world physical analogues, the same or substantially similar processor-executable instructions developed through training simulated instances 810 in simulated environment 800 may be deployed in real physical robots in the real physical world to enable such real physical robots to autonomously perform reusable work primitives.

The training processes described herein employ processor-executable instructions that, when executed, cause the robot, or any number of simulated instances of the robot, to perform a reusable work primitive. In accordance with the present systems, methods, and devices, such processor-executable instructions may originate from and/or be generated by a teleoperation system.

Figure 9:
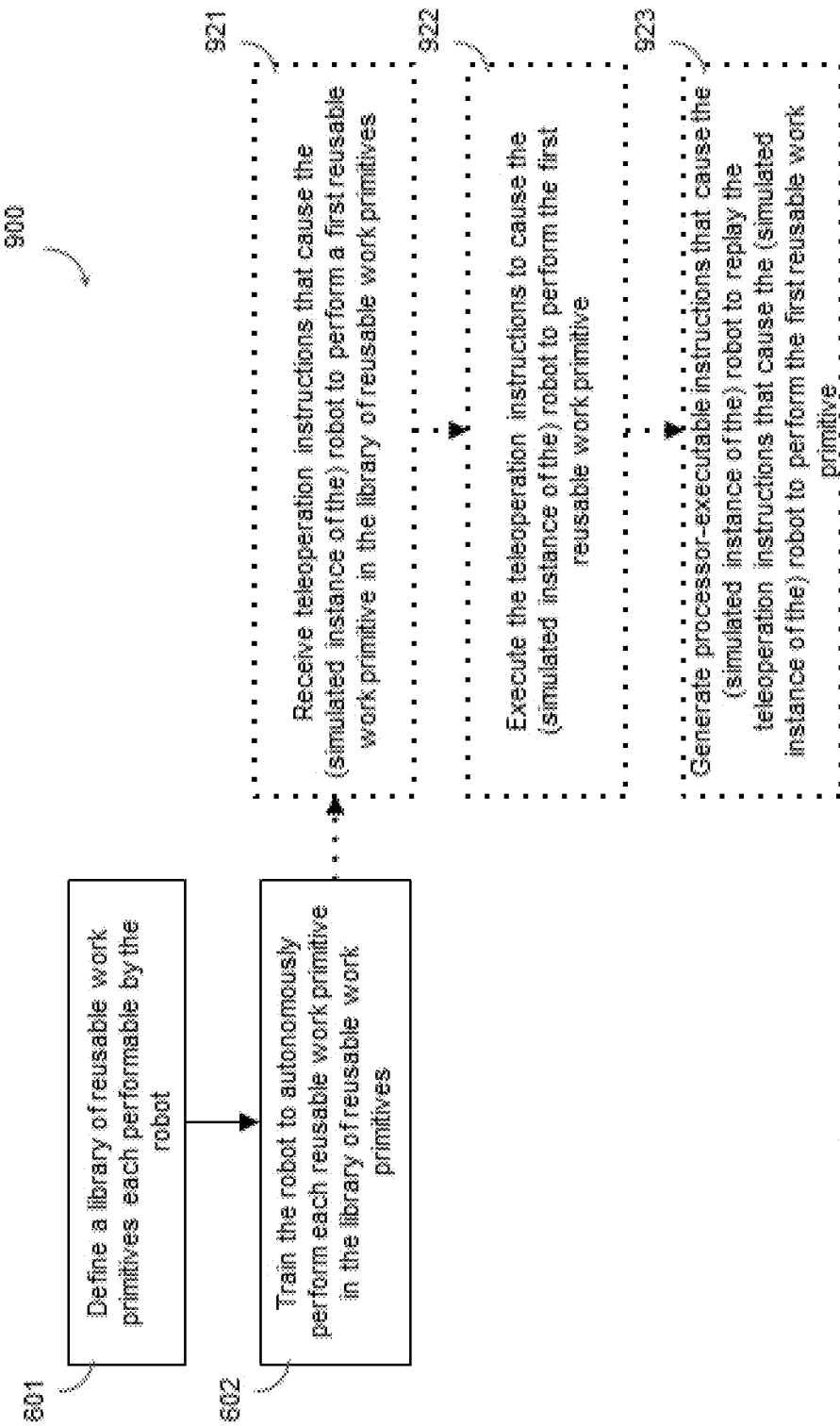
FIG. 9 is a flow diagram showing another exemplary computer-implemented method of initializing a robot to complete a multitude of work objectives in accordance with the present systems, devices, and methods.

FIG. 9 is a flow diagram showing an exemplary computer-implemented method 900 of initializing a robot to complete a multitude of work objectives in accordance with the present systems, devices, and methods. Method 900 includes two main acts 601 and 602, and act 602 includes three sub-acts 921, 922, and 923, though those of skill in the art will appreciate that in alternative implementations certain acts/sub-acts may be omitted and/or additional acts/sub-acts may be added. Those of skill in the art will also appreciate that the illustrated order of the acts/sub-acts is shown for exemplary purposes only and may change in alternative implementations. Acts 601 and 602 of method 900 are substantially similar to acts 602 and 602 of method 600. Method 900 is a computer-implemented method that may be performed by one or more computer system(s) comprising conventional computing hardware such as at least one processor communicatively coupled with at least one non-transitory processor-readable storage medium and various other well-known components such as a system bus, input/output peripherals, networking hardware, and so on, as well as conventional software and firmware stored in the non-transitory processor-readable storage medium such as BIOS, various drivers, an operating system, and the like. In accordance with the present systems, methods, and devices, the at least one non-transitory processor-readable storage medium may also store data and/or processor-executable instructions (e.g., a computer program product) that, when executed by the at least one processor communicatively coupled to the at least one non-transitory processor-readable storage medium, cause the computer system to perform computer-implemented method 900.

At 601, a library of reusable work primitives is defined in a similar to way to as described in the details of method 600.

At 602, the robot is trained to autonomously perform each reusable work primitive in the library of reusable work primitives in a similar way to as described in the details of method 600; however, in method 900 act 602 includes sub-acts 921, 922, and 923. In some implementations of method 900, act 602 may be performed using only one or more real physical robot(s), whereas in other implementations of method 900 act 602 may be performed using any number of simulated instances of a real physical robot.

At 921, which is a part of training the robot at 602, teleoperation instructions are received that cause the (simulated instance of the) robot to perform a first reusable work primitive in the library of reusable work primitives. The teleoperation instructions may be received from a teleoperation system, further exemplary details of which are described later on. When act 602 is performed using a real physical robot, the teleoperation instructions may be received by the real physical robot at 921. When act 602 is performed using any number of simulated instances of the real physical robot, the teleoperation instructions may be received by the computer system running the simulation at 921.

At 922, which is a part of training the robot at 602, the teleoperation instructions are executed to cause the (simulated instance of the) robot to perform the first reusable work primitive. When act 602 is performed using a real physical robot, the teleoperation instructions may be executed by the real physical robot at 922. When act 602 is performed using any number of simulated instances of the real physical robot, the teleoperation instructions may be executed by the computer system running the simulation at 922.

At 923, which is a part of training the robot at 602, processor-executable instructions are generated. The processor-executable instructions cause the (simulated instance of the) robot to replay the teleoperation instructions that cause the (simulated instance of the) robot to perform the first reusable work primitive. In other words, the processor-executable instructions may represent an executable copy of the teleoperation instructions that, when executed by the (simulated instance of the) robot, cause the (simulated instance of the) robot to replay the teleoperation instructions and autonomously perform the first reusable work primitive without the teleoperation instructions themselves (i.e., without receiving additional teleoperation instructions providing the detail of how to perform the first reusable work primitive). When act 602 is performed using a real physical robot, the processor-executable instructions generated at 923 may be recalled or executed by the robot to autonomously perform the first reusable work primitive when needed. When act 602 is performed using any number of simulated instances of the real physical robot, the processor-executable instructions may be delivered to or loaded into the real physical robot (e.g., as a computer program product) and executed by the robot to cause the robot to perform the first reusable work primitive when needed.

In accordance with the present systems, methods, and devices, sub-acts 921, 922, and 923 of act 602 of method 900 may be repeated for each respective reusable work primitive in the library of reusable work primitives.

In some implementations, the teleoperation instructions may include a first set of teleoperation instructions that cause the (simulated instance of the) robot to perform a first instance of the first reusable work primitive in the library of reusable work primitives and a second set of teleoperation instructions that cause the (simulated instance of the) robot to perform a second instance of the first reusable work primitive in the library of reusable work primitives, where the first set of teleoperation instructions and the second set of teleoperation instructions differ from one another in some way such that the first instance of the first reusable work primitive and the second instance of the first reusable work primitive also differ in some way. The difference(s) between the first set of teleoperation instructions and the second set of teleoperation instructions, and the resulting difference(s) between the first instance of the first reusable work primitive and the second instance of the first reusable work primitive, allow comparisons to be made and an advantageous formulation of the teleoperation instructions that cause the (simulated instance of the) robot to perform the first reusable work primitive to be identified and further developed. For example, in some implementations of method 900 the respective results of executing the first set of teleoperation instructions to cause the robot to perform the first instance of the first reusable work primitive and executing the second set of teleoperation instructions to cause the robot to perform the second instance of the first reusable work primitive may be evaluated (e.g., compared) to determine which of the first set of teleoperation instructions and the second set of teleoperation instructions produces a better result according to some measure of success. A "better result" may include a result that has fewer errors, is more accurate or precise, uses less power, is performed more quickly, is performed with greater aesthetic appeal, and/or is advantageous according to any other measure of success. When a particular set of teleoperation instructions that produces a better result is identified (i.e., among the first set and second sets of teleoperation instructions, and/or any other sets of teleoperation instructions evaluated), the processor-executable instructions generated at 923 may advantageously be designed to cause the (simulated instance of the) robot to replay whichever teleoperation instructions produces the better result.

In some implementations of method 900, at least one element of a first set of teleoperation instructions and at least one element of a second set of teleoperation instructions may be combined in the processor-executable instructions generated at 923. That is, the processor-executable instructions generated at 923 may include a combination of advantageous elements of the first set of teleoperation instructions and advantageous elements of the second set of teleoperation instructions.

The teleoperation system, and therefore the teleoperation instructions received from the teleoperation system, may take a variety of different forms. In some implementations, the teleoperation system may include sensors that detect real physical actions performed by a real physical entity (such as s human user) piloting the (simulated instance of the) robot and the teleoperation instructions may cause the (simulated instance of the) robot to emulate the real physical actions performed by such real teleoperation pilot. Teleoperation systems that cause the (simulated instance of the) robot to emulate real physical actions performed by a real teleoperation pilot are referred to herein as "low-level" teleoperation systems because of the low level of abstraction between the actions of the pilot and the actions of the (simulated instance of the) robot. Accordingly, teleoperation instructions provided by a low-level teleoperation system are referred to herein as "low-level" teleoperation instructions.

In some implementations, the teleoperation system may include a graphical user interface, or GUI, that presents a set of candidate actions to a user or pilot and the teleoperation instructions may cause the (simulated instance of the) robot to perform actions selected from the GUI. Such a GUI-based teleoperation system provides a higher level of abstraction between the actions of the pilot and the actions of the (simulated instance of the) robot and are referred to herein as "high-level" teleoperation systems. Accordingly teleoperation instructions provided by a high-level teleoperation system are referred to herein as "high-level" teleoperation systems.

In some implementations, a first set of low-level teleoperation instructions that cause the (simulated instance of the) robot to perform a first reusable work primitive may be used in an initial iteration of a training process (e.g., method 600, method 700, and/or method 900) to generate a first set of processor-executable that cause the (simulated instance of the) robot to autonomously perform the first reusable work primitive, and a subsequent iteration of the training process may make use of high-level teleoperation instructions to further refine the processor-executable instructions that cause the (simulated instance of the) robot to autonomously perform the first reusable work primitive.

Figure 10:
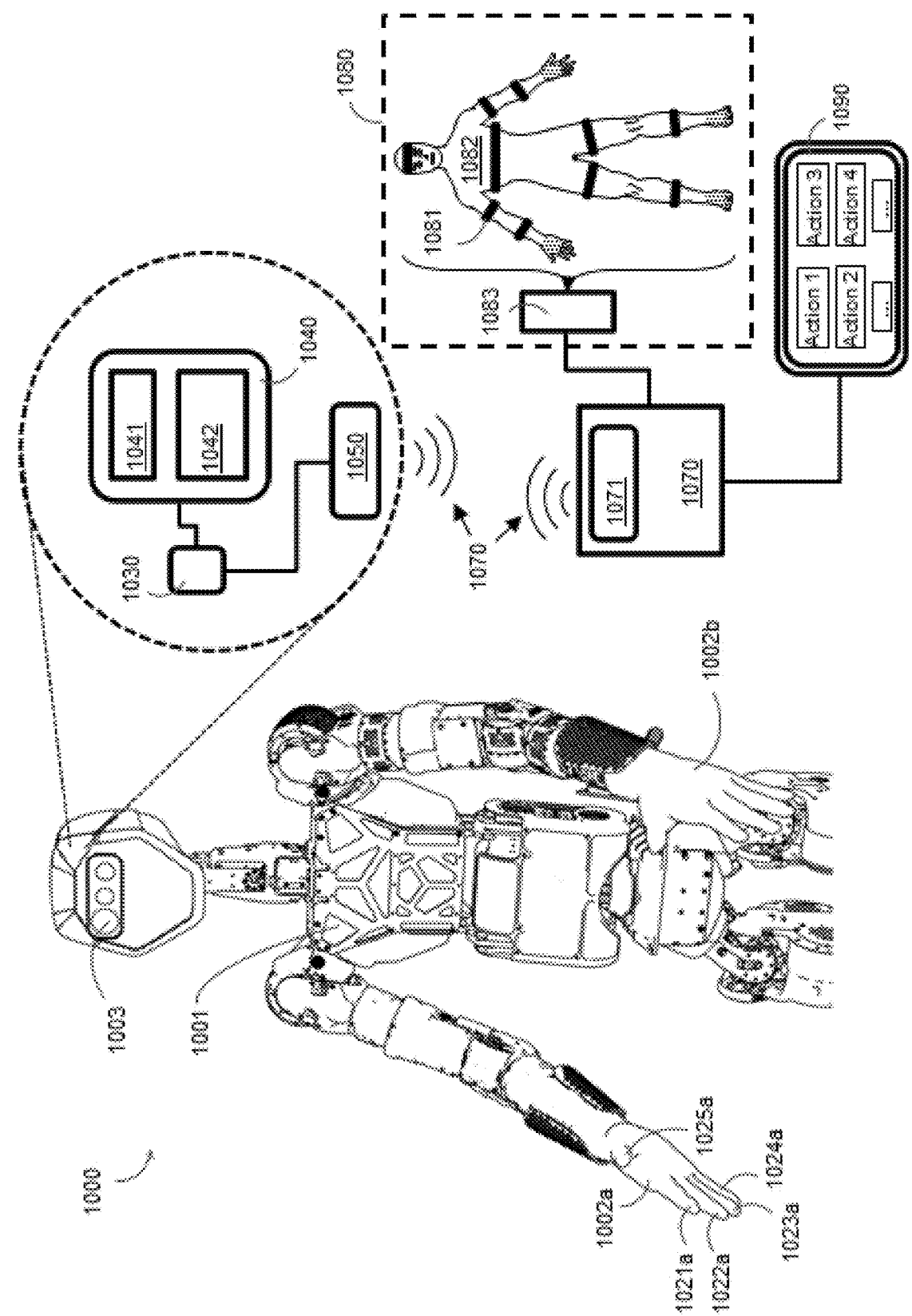
FIG. 10 is an illustrative diagram of an exemplary robot system comprising various features and components described throughout the present systems, methods and devices.

FIG. 10 is an illustrative diagram of an exemplary robot system 1000 comprising various features and components described throughout the present systems, methods and devices. Robot system 1000 comprises a robot body 1001 with a first physically actuatable component 1002a and a second physically actuatable component 1002b mechanically coupled to body 1001. In the illustrated implementation, first and second physically actuatable components 1002a and 1002b each correspond to a respective robotic hand, though a person of skill in the art will appreciate that in alternative implementations a physically actuatable component may take on other forms (such as an arm or leg, a non-hand-like end effector such as a cutter or suction tube, or any other form useful to the particular applications the robot is intended to perform). Robotic hand 1002a emulates a human hand and includes multiple fingers 1021a, 1022a, 1023a, and 1024a and an opposable thumb 1025a. Robotic hand 1002b is similar to a mirror-image of robotic hand 1002a while corresponding details are not labeled for robotic hand 1002b to reduce clutter. Robotic hands 1002a and 1002b may be physically actuatable by a variety of different means, including electromechanical actuation, cable-driven actuation, magnetorheological fluid-based actuation, and/or hydraulic actuation. Some exemplary details of actuation technology that may be employed to physically actuate robotic hands 1002a and 1002b are described in U.S. patent application Ser. No. 17/491,577 and U.S. Provisional Patent Application Ser. No. 63/191,732, filed May 21, 2021 and entitled "Systems, Devices, And Methods For A Hydraulic Robotic Arm", both of which are incorporated by reference herein in their entirety.

Robot body 1001 further includes at least one sensor 1003 that detects and/or collects data about the environment and/or objects in the environment of robot system 1000. In the illustrated implementation, sensor 1003 corresponds to a sensor system including a camera, a microphone, and an initial measurement unit that itself comprises three orthogonal accelerometers, a magnetometer, and a compass.

For the purposes of illustration, FIG. 10 includes details of certain exemplary components that are carried by or within robot body 1001 in accordance with the present systems, methods, and devices. Such components include at least one processor 1030 and at least one non-transitory processor-readable storage medium, or "memory", 1040 communicatively coupled to processor 1030. Memory 1040 stores a library of reusable work primitives 1041 (which may or may not include a library of reusable grasp primitives for either or both of robotic hands 1002a and/or 1002b depending on the implementation) and processor-executable instructions 1042 that, when executed by processor 1030, cause robot body 1001 (including applicable actuatable components such as either or both of robotics hands 1002a and/or 1002b) to selectively and autonomously perform the reusable work primitives in library of reusable work primitives 1041. Depending on the specific implementation, processor-executable instructions 1042 may further include processor-executable instructions (e.g., a computer program product) that cause robot system to perform any or all of methods 100, 200, 300, and/or 500 described herein, and/or relevant acts of methods 700 and/or 900.

Processor 1030 is also communicatively coupled to a wireless transceiver 1050 via which robot body 1001 sends and receives wireless communication signals 1060 with an exemplary teleoperation system 1070. To this end, teleoperation system 1070 also includes a wireless transceiver 1071.

For the purposes of illustration, teleoperation system 1070 includes both a low-level teleoperation interface 1080 and a high-level teleoperation interface 1090. Low-level teleoperation interface 1080 includes a sensor system 1081 that detects real physical actions performed by a human pilot 1082 and a processing system 1083 that converts such real physical actions into low-level teleoperation instructions that, when executed by processor 1030, cause robot body 1001 (and any applicable actuatable components such as hands 1002a and/or 1002b) to emulate the physical actions performed by pilot 1082. In some implementations, sensor system 1081 may include many sensory components typically employed in the field of virtual reality games, such as haptic gloves, accelerometer-based sensors worn on the body of pilot 1082, and a VR headset that enables pilot 1082 to see optical data collected by sensor 1003 of robot body 1001. High-level teleoperation interface 1090 includes a simple GUI displayed, in this exemplary implementation, on a tablet computer. The GUI of high-level teleoperation interface 1090 provides a set of buttons each corresponding to a respective action performable by robot body 1001 (and applicable actuatable components such as hands 1002a and/or 1002b). Action(s) selected by a user/pilot of high-level teleoperation interface 1090 through the GUI are converted into high-level teleoperation instructions that, when executed by processor 1030, cause robot body 1001 (and any applicable actuatable components such as hands 1002a and/or 1002b) to perform the selected action(s).

In accordance with the present systems, devices, and methods, a multi-purpose robot may be trained to autonomously execute a finite number of reusable work primitives in order to autonomously perform a multitude of tasks. Such a multi-purpose robot may include an on-board non-transitory processor-readable storage medium communicatively coupled to at least one on-board processor. The non-transitory processor-readable storage medium may store data and/or processor-executable instructions, which may include a library of reusable primitives that the robot is capable of performing autonomously. In operation, the at least one processor of the robot may execute data and/or processor-executable instructions to cause the robot to analyze a task and identify a particular sequence of work primitives from the stored library of work primitives that, when carried out by the robot, will result in completion of the task's objective.

The robots described herein may, in some implementations, employ any of the teachings of U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/253,591, U.S. Provisional Patent Application Ser. No. 63/293,968, U.S. Provisional Patent Application Ser. No. 63/293,973, and/or U.S. Provisional Patent Application Ser. No. 63/278,817, each of which is incorporated herein by reference in its entirety.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of operation of a robot having a robotic hand with multiple fingers and an opposable thumb, the method comprising:
   collecting first data about an object by at least one sensor;
   analyzing, by at least one processor, the first data to determine a first attribute of the object, wherein the first attribute of the object is a geometry of the object;
   accessing, by the at least one processor, second data about the object;

determining, by the at least one processor, a second attribute of the object based on the first data or the second data, wherein the second attribute of the object is different from the first attribute of the object;

accessing, by the at least one processor, a library of reusable grasp primitives for the robotic hand, wherein each reusable grasp primitive in the library of reusable grasp primitives corresponds to a particular configuration of the multiple fingers and opposable thumb;

determining at least two grasp primitive characteristics based on the first attribute and the second attribute of the object;

determining a set of reusable grasp primitives from the library of reusable grasp primitives based on the at least two grasp primitive characteristics;

generating, by the at least one processor, a set of grasping events for the set of reusable grasp primitives from the library of reusable grasp primitives, wherein each grasping event comprises simulating, by the at least one processor, the robotic hand grasping the object with a reusable grasp primitive from the set of reusable grasp primitives;

assigning, by the at least one processor, a grasping score to the respective reusable grasp primitive in each grasping event based on a degree of fit between the respective reusable grasp primitive and at least the first attribute of the object;

selecting, by the at least one processor, a first reusable grasp primitive from the set of reusable grasp primitives; and executing, by the robotic hand, the first reusable grasp primitive to grasp the object.

2. The method of claim 1, wherein selecting the first reusable grasp primitive from the set of reusable grasp primitives comprises selecting the reusable grasp primitive with the highest grasping score in the set of reusable grasp primitives.

3. The method of claim 1, further comprising initiating, by the at least one processor, a workflow to complete a work objective involving the object, wherein generating the set of grasping events is in response to initiating the workflow.

4. The method of claim 3, further comprising executing the workflow by the at least one processor, wherein executing the first reusable grasp primitive to grasp the object is in response to executing the workflow.

5. The method of claim 3, wherein the second data comprises the work objective, wherein the second attribute of the object is determined based on the work objective, and wherein the grasping score is assigned to the respective reusable grasp primitive in each grasping event based on a degree of fit between the respective reusable grasp primitive and each of the first and second attributes of the object.

6. The method of claim 1, wherein the second attribute of the object is a hardness of the object, a rigidity of the object, an identity of the object, a function of the object, or a mass of the object.

7. A robot comprising:
a robotic hand having multiple fingers and an opposable thumb;
at least one processor coupled to memory and operative to control actuations of the robotic hand;
at least one sensor communicatively coupled to the at least one processor; and
one or more processor-readable storage media storing instructions that when executed by the at least one processor cause the robot to perform operations comprising:

initiating a workflow to complete a work objective involving grasping an object;

analyzing first data collected by the at least one sensor to determine a first attribute of the object, wherein the first attribute of the object is a geometry of the object;

determining a second attribute of the object from the first data or second data about the object, wherein the second attribute of the object is different from the first attribute of the object;

accessing a library of reusable grasp primitives for the robotic hand, wherein each reusable grasp primitive in the library of reusable grasp primitives corresponds to a particular configuration of the multiple fingers and opposable thumb;

determining at least two grasp primitive characteristics for the object based on the first attribute and the second attribute of the object;

determining a set of reusable grasp primitives from the library of reusable grasp primitives based on the at least two grasp primitive characteristics;

modeling a set of grasping events for the set of reusable grasp primitives from the library of reusable grasp primitives, wherein modeling of each grasping event comprises modeling the robotic hand with a reusable grasp primitive from the set of reusable grasp primitives and applying the modeled robotic hand to a model of the object;

assigning a grasping score to the respective reusable grasp primitive in each grasping event based on the modeling of the grasping event, wherein the grasping score is indicative of a degree of fit between the respective reusable grasp primitive and the model of the object;

selecting a first reusable grasp primitive from the set of reusable grasp primitives; and executing the first reusable grasp primitive to cause the robotic hand to grasp the object.

8. The robot of claim 7, wherein selecting the first reusable grasp primitive from the set of reusable grasp primitives comprises selecting the reusable grasp primitive with the highest grasping score in the set of reusable grasp primitives.

9. The robot of claim 8, wherein the geometry of the object is represented in the model of the object, and wherein the grasping score is assigned to the respective reusable grasp primitive in each grasping event based on a degree of fit between the respective reusable grasp primitive and the geometry of the object represented in the model of the object.

10. The robot of claim 9, wherein the robot comprises a head and a body, wherein the robotic hand is mechanically coupled to the body, and wherein the at least one sensor is coupled to the head.

11. The robot of claim 10, wherein the at least one sensor comprises an optical sensor.

12. The robot of claim 9, wherein the second data comprises the work objective, wherein the second attribute of the object is determined based on the work objective, and wherein the model of the object in the modeling of the grasping events further comprises a representation of the second attribute.

13. The robot of claim 7, wherein the second attribute of the object is a hardness of the object, a rigidity of the object, an identity of the object, a function of the object, or a mass of the object.

14. One or more non-transitory computer-readable storage media storing computer-executable instructions for causing a robot having a robotic hand with multiple fingers and an opposable thumb to perform operations comprising:
 collecting first data about an object by at least one sensor;
 analyzing the first data to determine a first attribute of the object, wherein the first attribute of the object is a geometry of the object;
 accessing second data about the object;
 determining a second attribute of the object based on the first data or the second data, wherein the second attribute of the object is different from the first attribute of the object;
 accessing a library of reusable grasp primitives for the robotic hand, wherein each reusable grasp primitive in the library of reusable grasp primitives corresponds to a particular configuration of the multiple fingers and opposable thumb;
 determining at least two grasp primitive characteristics based on the first attribute and the second attribute of the object;
 determining a set of reusable grasp primitives from the library of reusable grasp primitives based on the at least two grasp primitive characteristics;
 generating a set of grasping events for the set of reusable grasp primitives from the library of reusable grasp primitives, wherein each grasping event comprises simulating a model of the robotic hand grasping a model of the object with a reusable grasp primitive from the set of reusable grasp primitives;
 assigning a grasping score to the respective reusable grasp primitive in each grasping event based on a degree of fit between the respective reusable grasp primitive and at least the first attribute of the object;
 selecting a first reusable grasp primitive from the set of reusable grasping primitives; and
 controlling the robotic hand to execute the first reusable grasp primitive and grasp the object.

15. The one or more non-transitory computer-readable storage media of claim 14, wherein selecting the first reusable grasp primitive from the set of reusable grasp primitives comprises selecting the reusable grasp primitive with the highest grasping score in the set of reusable grasping primitives.

\* \* \* \* \*